US008040413B2

(12) United States Patent
Egawa et al.

(10) Patent No.: US 8,040,413 B2
(45) Date of Patent: Oct. 18, 2011

(54) SOLID-STATE IMAGE PICKUP DEVICE

(75) Inventors: Yoshitaka Egawa, Yokohama (JP); Hiroto Honda, Yokohama (JP); Yoshinori Iida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 12/019,191

(22) Filed: Jan. 24, 2008

(65) Prior Publication Data

US 2008/0180557 A1 Jul. 31, 2008

(30) Foreign Application Priority Data

Jan. 26, 2007 (JP) ................................. 2007-016638

(51) Int. Cl.

| | |
|---|---|
| ***H04N 9/083*** | (2006.01) |
| ***H04N 3/14*** | (2006.01) |
| ***H04N 5/335*** | (2006.01) |
| ***H04N 9/04*** | (2006.01) |

(52) U.S. Cl. ........ 348/278; 348/277; 348/279; 382/162; 382/167

(58) Field of Classification Search ........... 348/277–279
See application file for complete search history.

(56) References Cited

U.S. PATENT DOCUMENTS

| | | | | |
|---|---|---|---|---|
| 6,570,616 | B1 * | 5/2003 | Chen | 348/272 |
| 7,626,619 | B2 * | 12/2009 | Wada | 348/272 |
| 2005/0285968 | A1 * | 12/2005 | Sugimori | 348/345 |
| 2008/0143844 | A1 * | 6/2008 | Innocent | 348/223.1 |

FOREIGN PATENT DOCUMENTS

| | | |
|---|---|---|
| JP | 8-23542 | 1/1996 |
| JP | 2003-199117 | 7/2003 |
| JP | 2003-318375 | 11/2003 |
| JP | 2004-304706 | 10/2004 |
| JP | 2005-295381 | 10/2005 |
| WO | WO 2006/064564 | 6/2006 |

OTHER PUBLICATIONS

U.S. Appl. No. 11/690,364, filed Mar. 23, 2007, Yoshinori Iida et al.
U.S. Appl. No. 11/815,903, filed Aug. 9, 2007, Hiroto Honda et al.
U.S. Appl. No. 12/109,093, filed Apr. 24, 2008, Egawa.
U.S. Appl. No. 12/123,816, filed May 20, 2008, Egawa.
U.S. Appl. No. 12/134,680, filed Jun. 6, 2008, Egawa.
U.S. Appl. No. 12/179,976, filed Jul. 25, 2008, Yasuo et al.
U.S. Appl. No. 12/278,347, filed Aug. 5, 2008, Honda et al.
May 10, 2011 Japanese Office Action issued in a corresponding Japanese application 2007-016638 w. English language translation.

* cited by examiner

*Primary Examiner* — Anthony J Daniels
(74) *Attorney, Agent, or Firm* — Oblon, Spivak, McClelland, Maier & Neustadt, L.L.P.

(57) ABSTRACT

In a pixel unit, W, R, G, and B pixels are arranged in rows and columns. The pixel unit output W, R, G, and B signals obtained by photoelectrically converting light incident on the W, R, G, and B pixels. An edge detection unit determines a specific area having a W pixel provided with a white filter as a central pixel in the pixel unit, divides the specific area into blocks including the central pixel, and detects edge information as to whether there is an edge of an image in each of the blocks. A block select unit selects a block with no edge from the edge information. A ratio calculating unit calculates the ratio coefficients of the R, G, and B signals from the selected block. An RGB signal generator generates new R, G, and B signals from the W signal of the central pixel using the ratio coefficients.

11 Claims, 22 Drawing Sheets

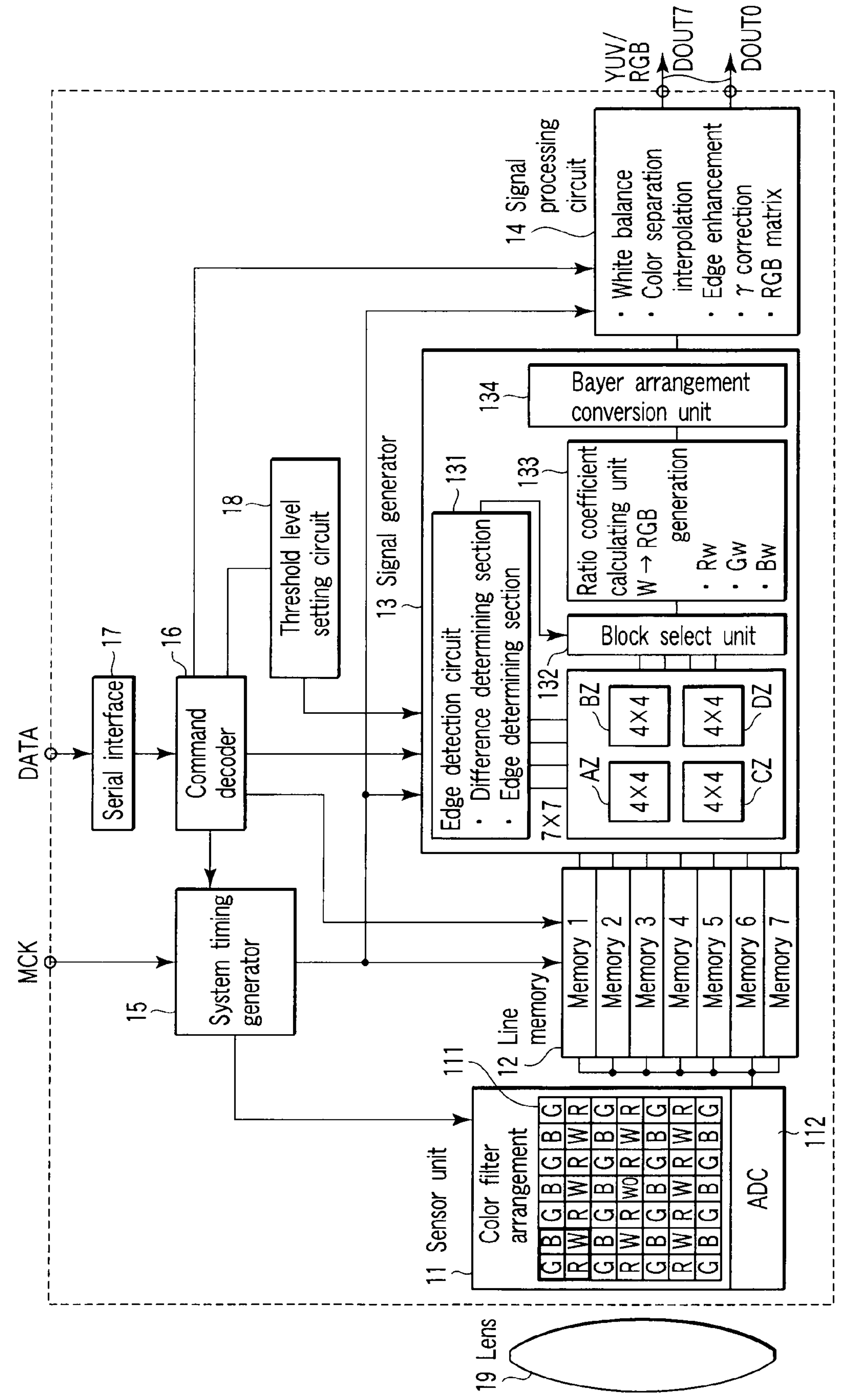
F I G. 1

(a)
| G1 | B1 | G2 | B2 |
|---|---|---|---|
| R1 | W1 | R2 | W2 |
| G5 | B4 | G6 | B5 |
| R5 | W4 | R6 | W0 |
2×2 pixel difference determination
ABS( ((G6+B5+R6+W0)-(G1+B1+R1+W1)) < LevN
ABS( ((G6+B5+R6+W0)-(G2+B2+R2+W2)) < LevN
ABS( ((G6+B5+R6+W0)-(G5+B4+R5+W4)) < LevN
(b)
3×3 pixel difference determination
ABS( ((W1+R2+W2+B4+G6+B5+W4+R6+W0)
  -(G1+B1+G2+R1+W1+R2+G5+B4+G6)) < LevN
(c)
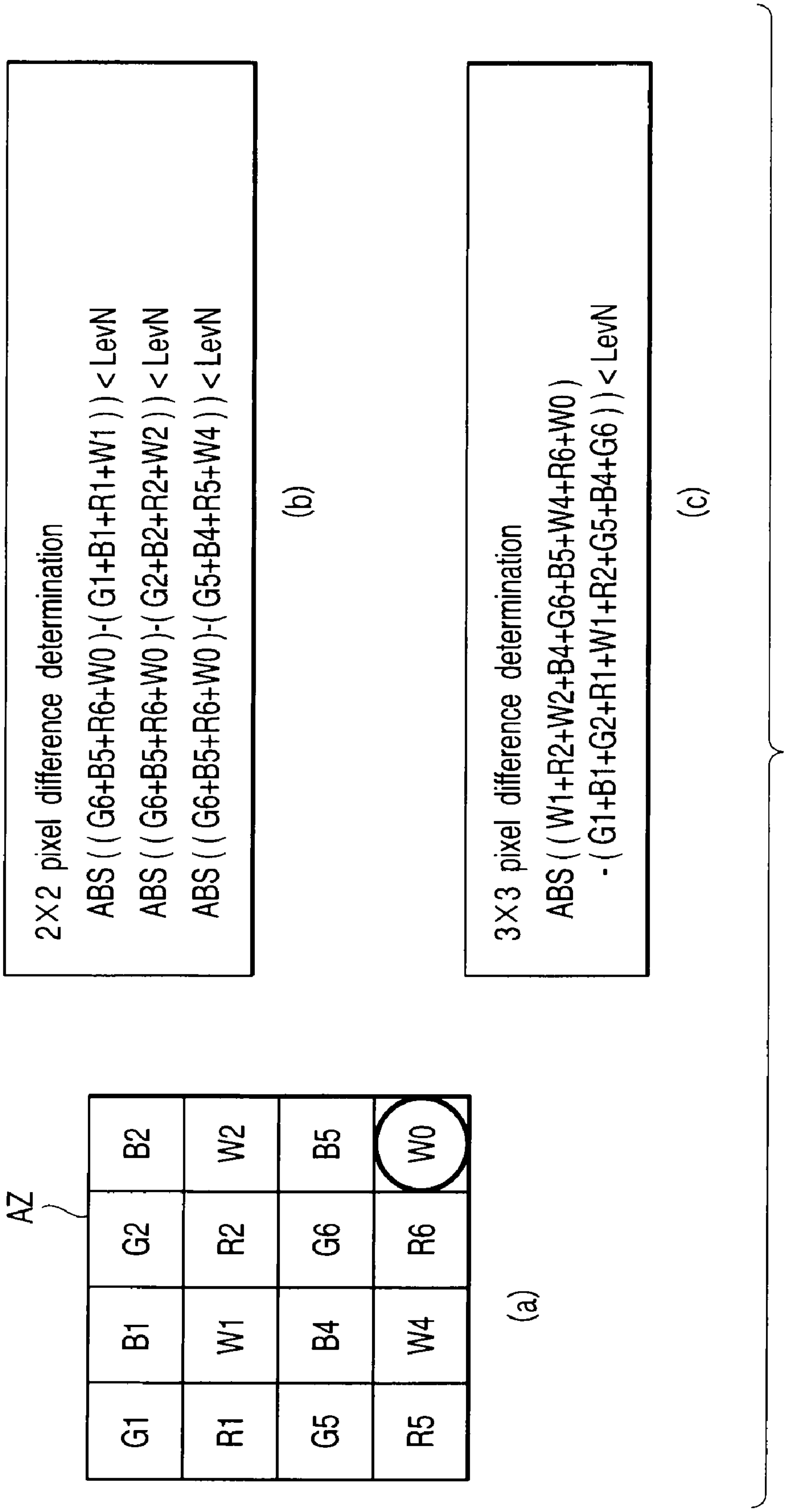
F I G. 3

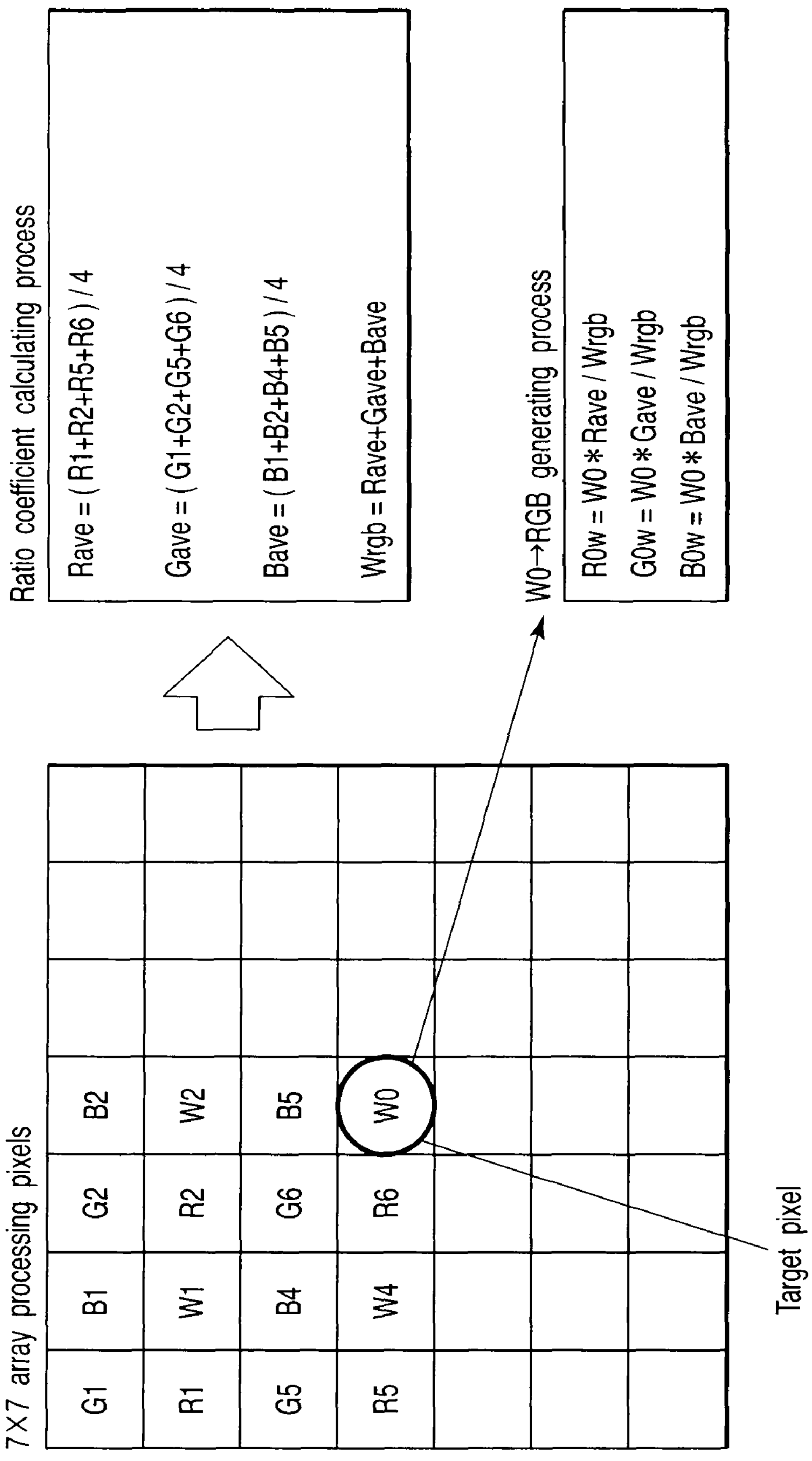
F I G. 5

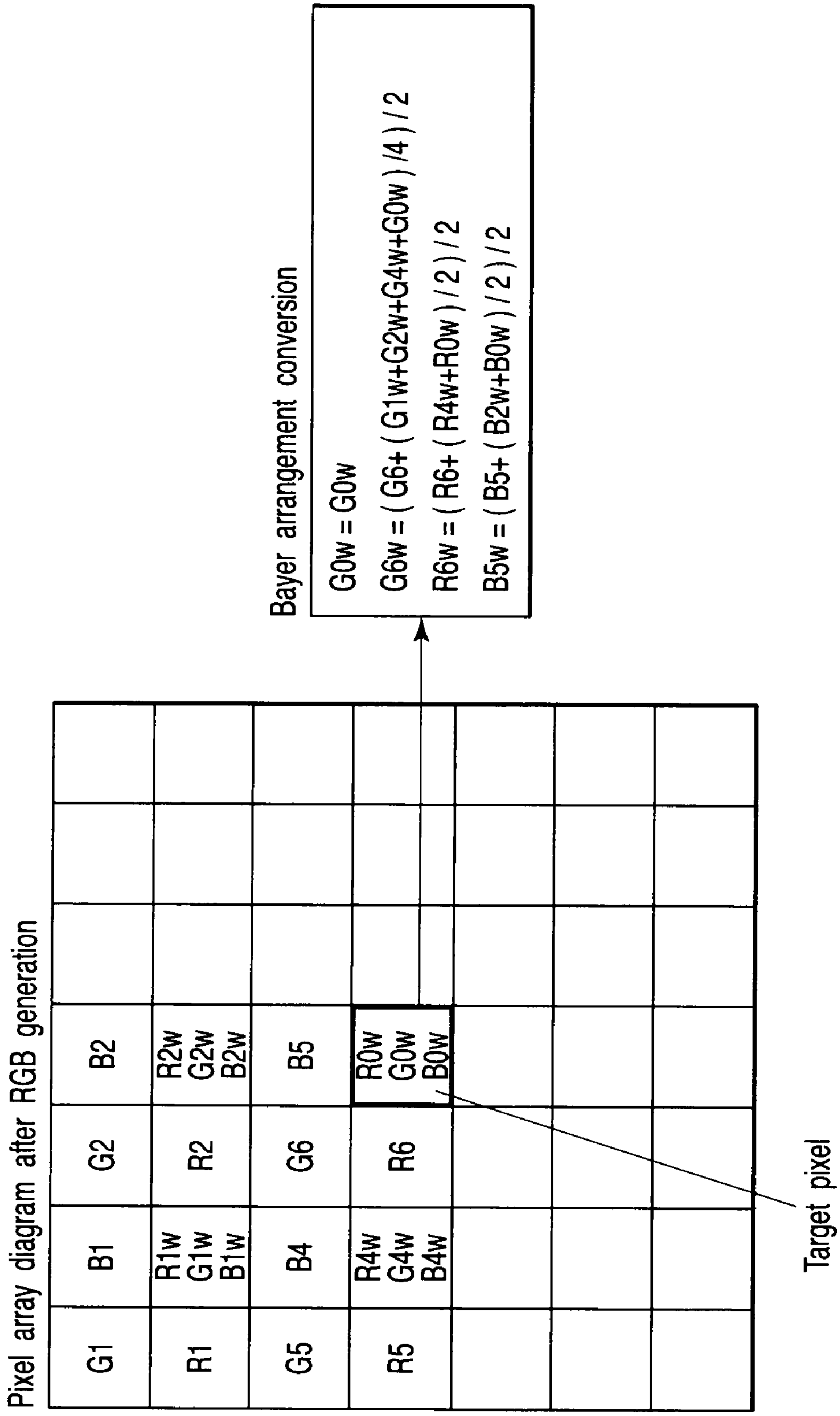
F I G. 6

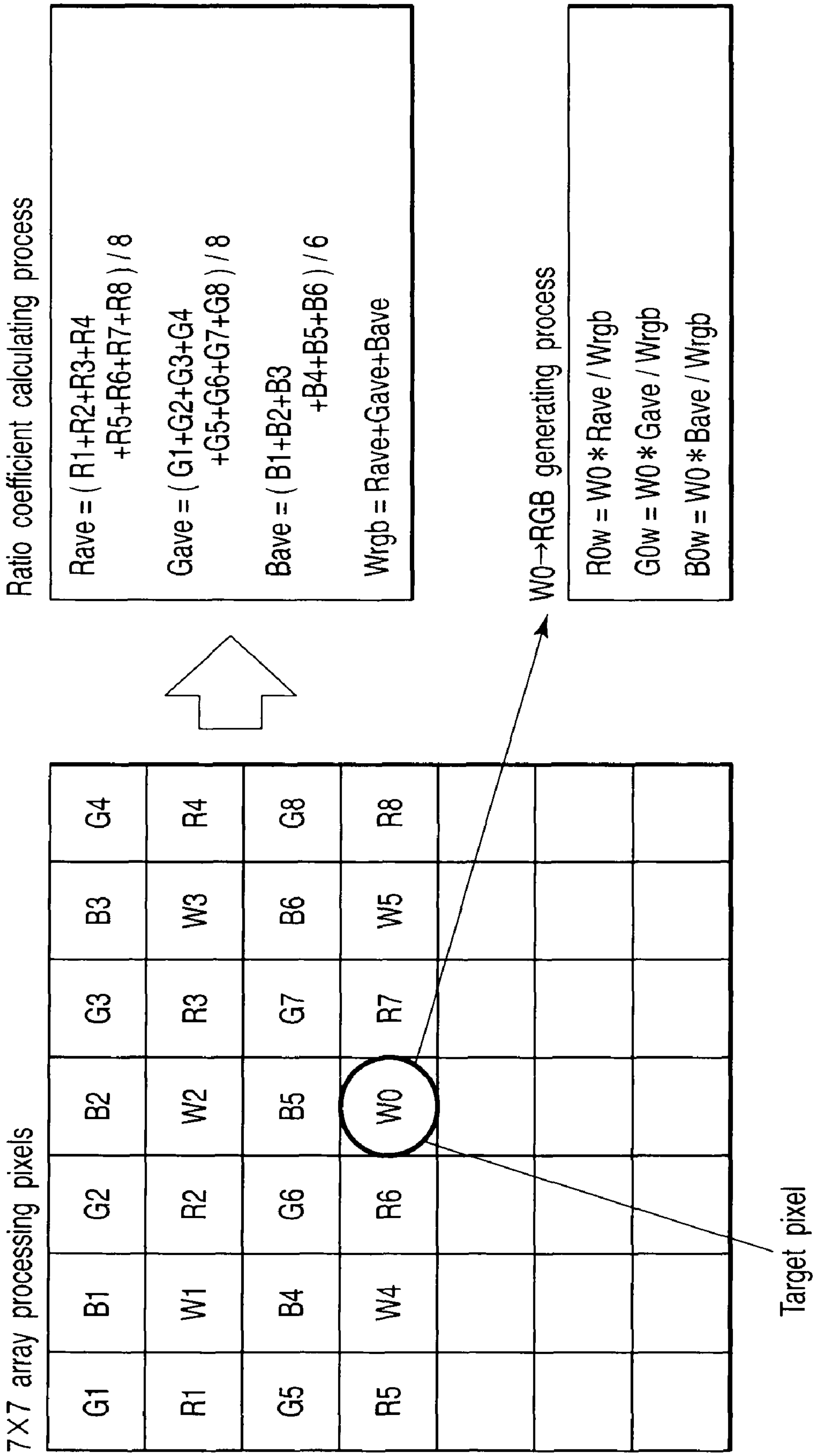
F I G. 7

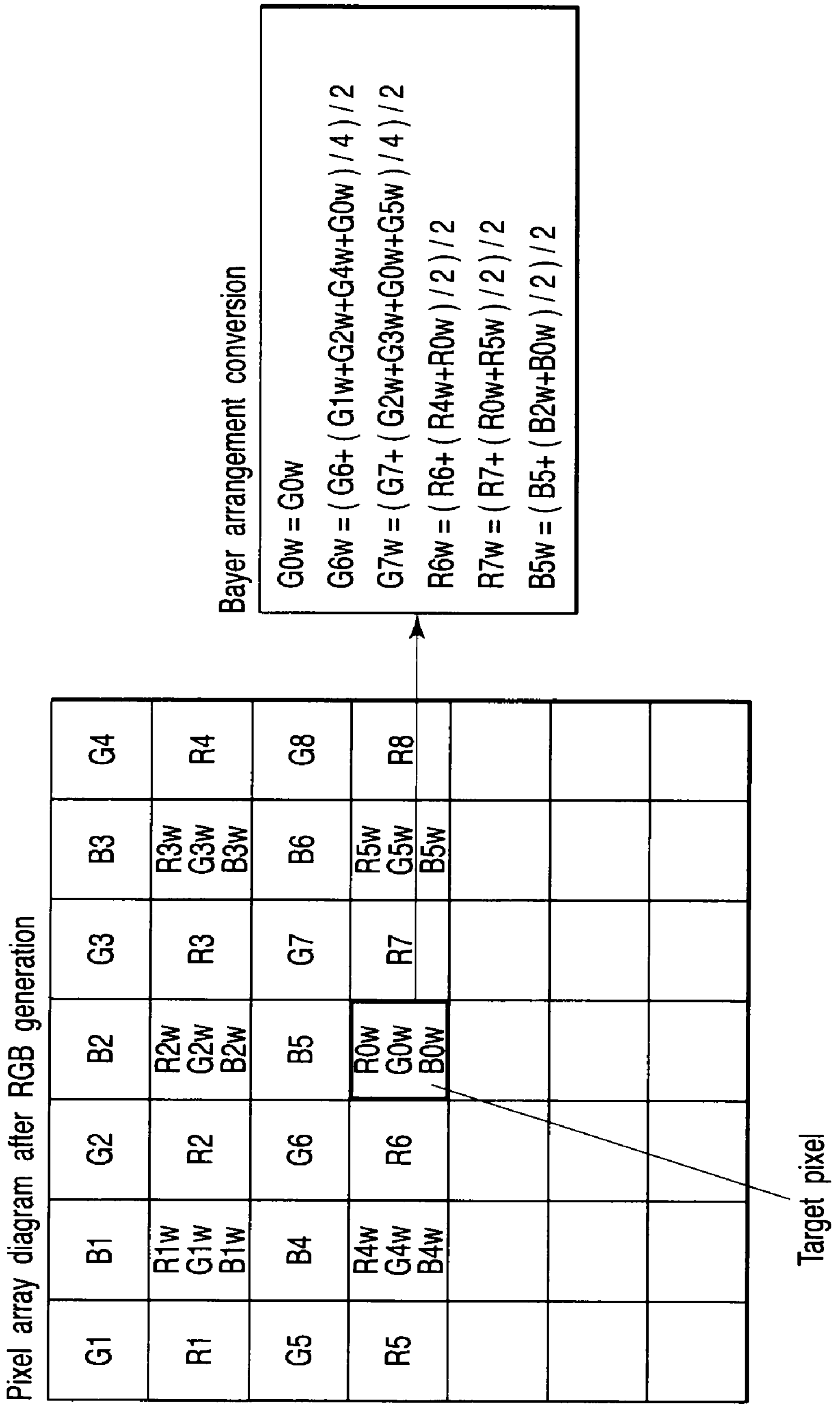
F I G. 8

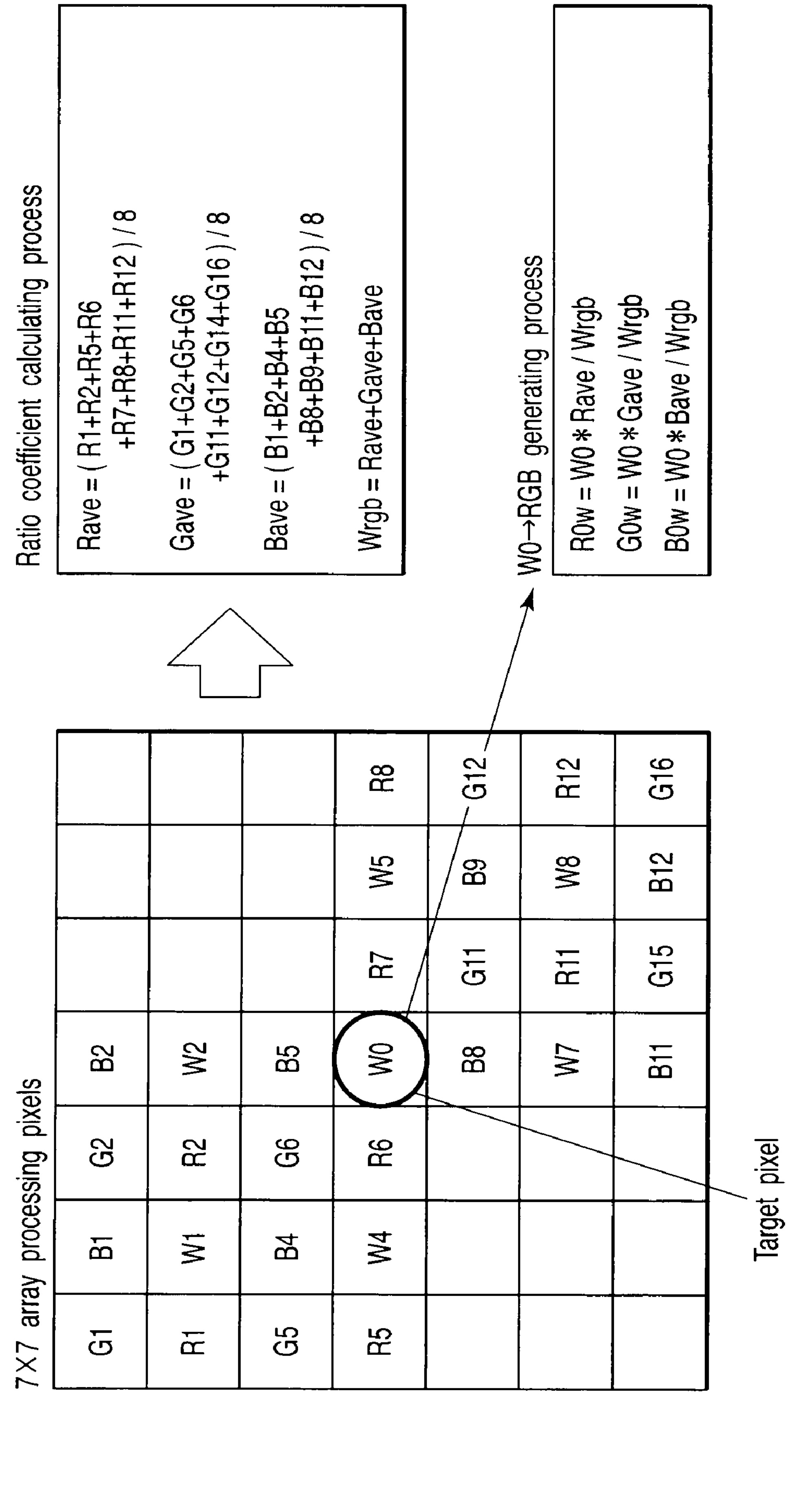
F I G. 9

Pixel array diagram after RGB generation

| | | | | | | |
|---|---|---|---|---|---|---|
| G1 | B1 | G2 | B2 | G3 | B3 | G4 |
| R1 | R1w G1w B1w | R2 | R2w G2w B2w | R3 | R3w G3w B3w | R4 |
| G5 | B4 | G6 | B5 | G7 | B6 | G8 |
| R5 | R4w G4w B4w | R6 | R0w G0w B0w | R7 | R5w G5w B5w | R8 |
| G9 | B7 | G10 | B8 | G11 | B9 | G12 |
| R9 | R6w G6w B6w | R10 | R7w G7w B7w | R11 | R8w G8w B8w | R12 |
| G13 | B10 | G14 | B11 | G15 | B12 | G16 |

Target pixel

Bayer arrangement conversion

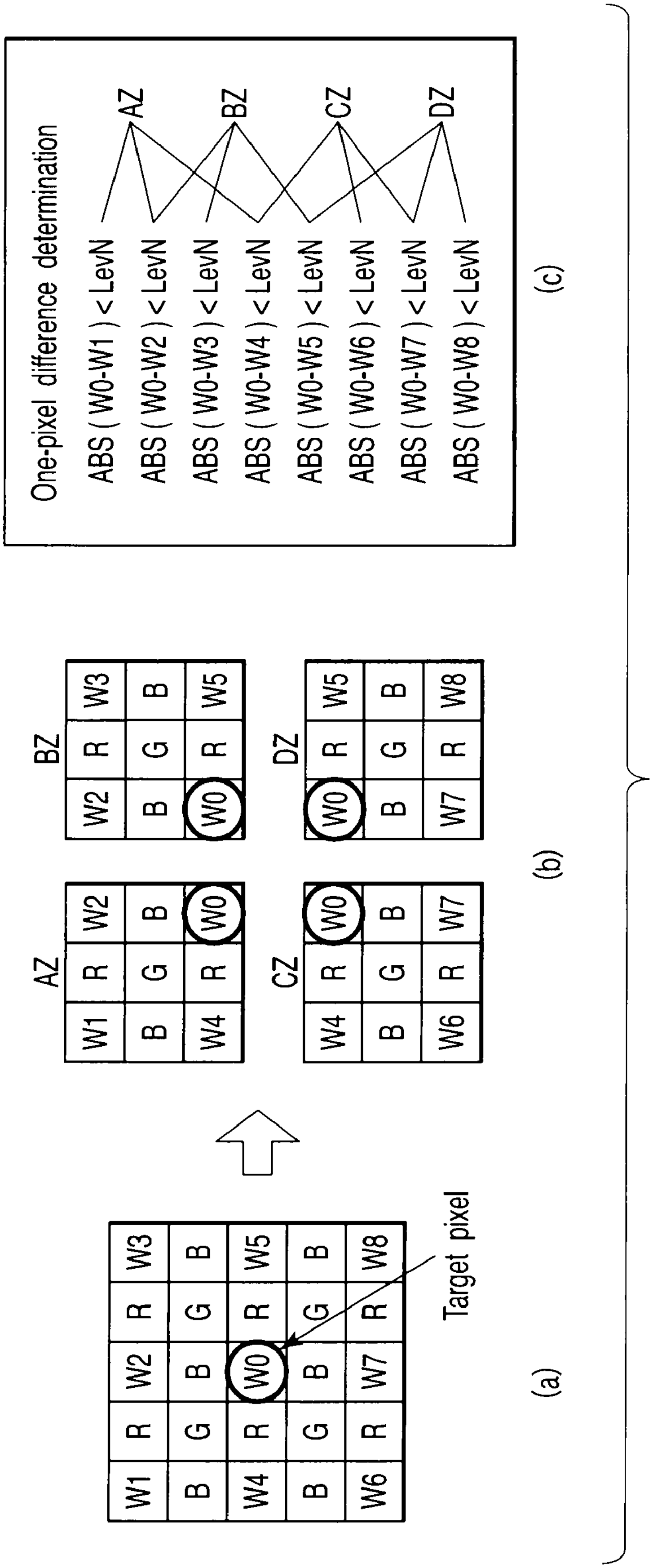
F I G. 16

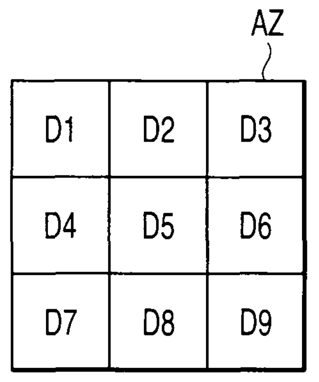

(a)

(b)

Two-pixel difference determination

ABS ( ( D6+D9 )-( D1+D4 ) ) < LevN

ABS ( ( D8+D9 )-( D1+D2 ) ) < LevN

ABS ( ( D4+D7 )-( D3+D6 ) ) < LevN

ABS ( ( D7+D8 )-( D2+D3 ) ) < LevN (c)

Three-pixel stripe difference determination

ABS ( ( D3+D6+D9 )-( D1+D4+D7 ) ) < LevN

ABS ( ( D7+D8+D9 )-( D1+D2+D3 ) ) < LevN (d)

Three-pixel L-shaped difference determination

ABS ( ( D6+D8+D9 )-( D1+D2+D4 ) ) < LevN

ABS ( ( D4+D7+D8 )-( D2+D3+D6 ) ) < LevN (e)

Four-pixel difference determination

ABS ( ( D5+D6+D8+D9 )-( D1+D2+D4+D5 ) ) < LevN

ABS ( ( D4+D5+D7+D8 )-( D2+D3+D5+D6 ) ) < LevN

F I G. 17

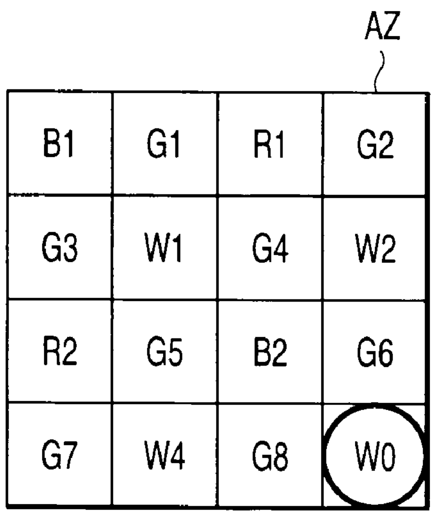
(a)
(b)
Two-pixel difference determination
ABS ( ( G6+W0 )-( G1+W1 ) ) < LevN
ABS ( ( G6+W0 )-( G4+W2 ) ) < LevN
ABS ( ( G6+W0 )-( G7+W4 ) ) < LevN
(c)
Three-pixel difference determination
ABS ( ( G6+G8+W0 )-( G1+G3+W1 ) ) < LevN
ABS ( ( G6+G8+W0 )-( G2+G4+W2 ) ) < LevN
ABS ( ( G6+G8+W0 )-( G5+G7+W4 ) ) < LevN
F I G. 19

(b)
Two-pixel difference determination
ABS(((G4+W0)-(G1+W3))) < LevN
ABS(((G4+W0)-(W2+G2))) < LevN
ABS(((G4+W0)-(W5+G3))) < LevN
(c)
Three-pixel difference determination
ABS(((W6+G4+W0)-(W3+G3+W6))) < LevN
ABS(((W6+G4+W0)-(W1+G1+W3))) < LevN
(a)
| W1 | G1 | W2 | G2 | AZ |
|----|----|----|----|----|
| B1 | W3 | R1 | W4 |    |
| W5 | G3 | W6 | G4 |    |
| R2 | W7 | B2 | W0 |    |
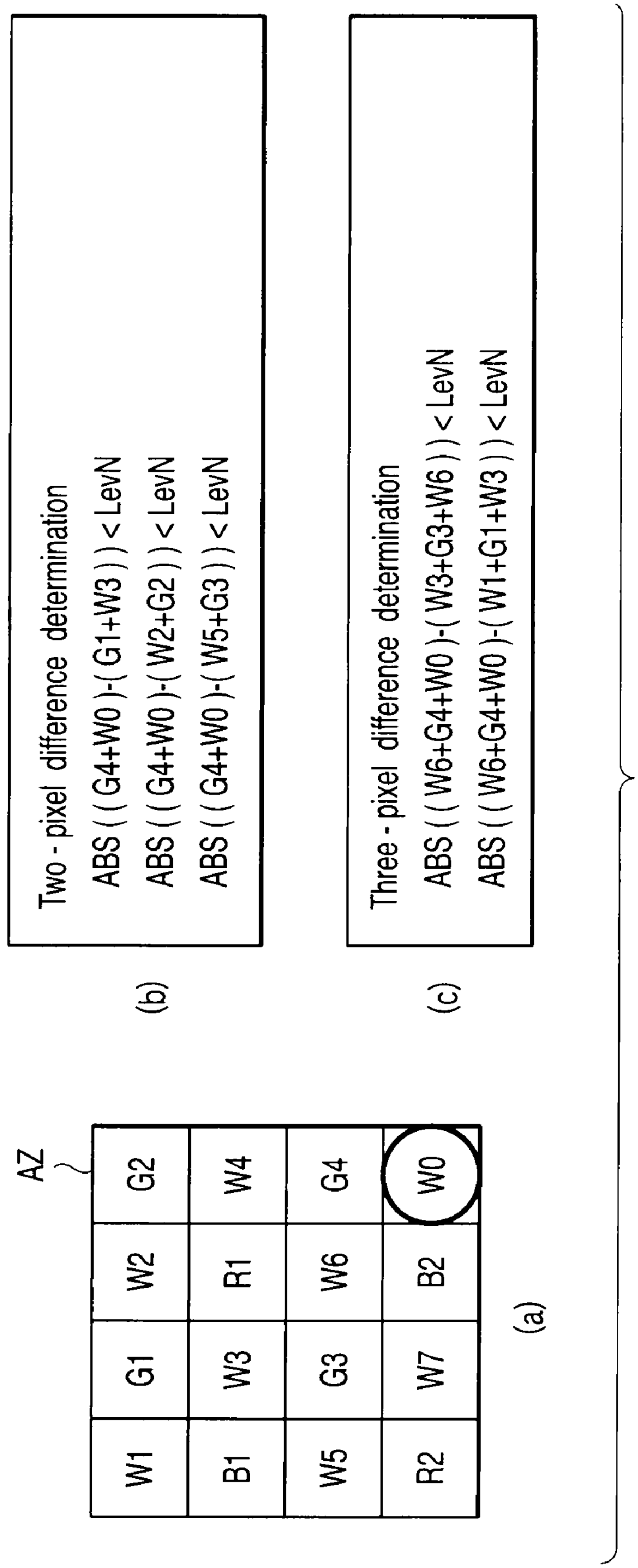
F I G. 21

SOLID-STATE IMAGE PICKUP DEVICE

CROSS-REFERENCE TO RELATED APPLICATIONS

This application is based upon and claims the benefit of priority from prior Japanese Patent Application No. 2007-016638, filed Jan. 26, 2007, the entire contents of which are incorporated herein by reference.

BACKGROUND OF THE INVENTION

1. Field of the Invention

This invention relates to a solid-state image pickup device, such as a charge-coupled device (CCD) image sensor or a CMOS image sensor. For example, this invention is used in an image-sensor-equipped cellular phone, a digital still camera, or a video camera.

2. Description of the Related Art

A wide variety of arrangements of color filters used in image sensors, ranging from complementary color filers to primary-color Bayer arrangements, have been proposed together with a method of processing the signals. With the further microfabrication of pixels in recent years, image sensors with pixels of the order of 2 μm have been put to practical use and the development of 1.75- and 1.4-μm pixels is now in progress. In microscopic pixels of the order of 2 μm or less, since the quantity of incident light decreases significantly, deterioration by noise is liable to take place. In this connection, as a method of increasing the sensitivity of microscopic pixels, an image sensor using a white (W) color filter has been proposed (e.g., refer to Jpn. Pat. Appln. KOKAI Publication No. 8-23542, Jpn. Pat. Appln. KOKAI Publication No. 2003-318375, Jpn. Pat. Appln. KOKAI Publication No. 2004-304706, or Jpn. Pat. Appln. KOKAI Publication No. 2005-295381).

However, since a W signal obtained from a highly sensitive W pixel is used as a Y signal (luminance signal)=W signal, there is a problem with color reproducibility. Normally, the color reproducibility of the RGB signals produced from the YUV signals becomes worse unless the Y signal is generated in this ratio: $Y=0.59G+0.3R+0.11B$. Furthermore, in the above patent documents, an effective signal process using W pixels has not been carried out.

BRIEF SUMMARY OF THE INVENTION

According to an aspect of the invention, there is provided a solid-state image pickup device comprising: a pixel unit in which W pixels, R pixels, G pixels, and B pixels are arranged in rows and columns two-dimensionally, the W pixels, R pixels, G pixels, and B pixels each having photoelectric conversion elements provided with a white (W) filter, a red (R) filter, a green (G) filter, and a blue (B) filter respectively and which outputs W signals, R signals, G signals, and B signals obtained by photoelectrically converting light incident on the W pixels, R pixels, G pixels, and B pixels; an edge detection unit which determines a specific area having a W pixel provided with a white (W) filter as a central pixel in the pixel unit, divides the specific area into a plurality of blocks including the central pixel, and detects edge information as to whether there is an edge of an image in each of the blocks; a block select unit which selects a block with no edge from the edge information detected by the edge detection unit; a ratio calculating unit which calculates a ratio coefficients of the R signals, G signals, and B signals from the block selected by the block select unit; and an RGB signal generator unit which generates a new R signal, G signal, and B signal from the W signal of the central pixel using the ratio coefficients calculated by the ratio calculating unit.

BRIEF DESCRIPTION OF THE SEVERAL VIEWS OF THE DRAWING

FIG. 1 is a block diagram schematically showing the configuration of a solid-state image pickup device according to a first embodiment of the invention;

FIG. 3 is a diagram to help explain another processing method in difference determination in a block of the first embodiment;

FIG. 5 is a diagram to help explain the calculation of ratio coefficients for block AZ and the process of generating RGB signals from W0 signal in the first embodiment;

FIG. 6 is a diagram to help explain a method of converting into Bayer arrangements in selecting a block shown in FIG. 5;

FIG. 7 shows a case where two blocks AZ and BZ are selected in (b) of FIG. 2;

FIG. 8 is a diagram to help explain a method of converting into Bayer arrangements in selecting a block shown in FIG. 7;

FIG. 9 shows a case where two blocks AZ and DZ diagonally located are selected in (b) of FIG. 2;

FIG. 14 is a diagram to help explain a method of converting into Bayer arrangements in selecting a block shown in FIG. 13;

FIG. 16 is a diagram to help explain a processing method in the edge detection circuit of the signal generator circuit according to the second embodiment;

FIG. 17 is a diagram to help explain another processing method in difference determination in a block of the second embodiment;

FIG. 19 is a diagram to help explain another processing method in difference determination in a block of the third embodiment;

FIG. 21 is a diagram to help explain another processing method in difference determination in a block of the fourth embodiment.

DETAILED DESCRIPTION OF THE INVENTION

Figure 2:
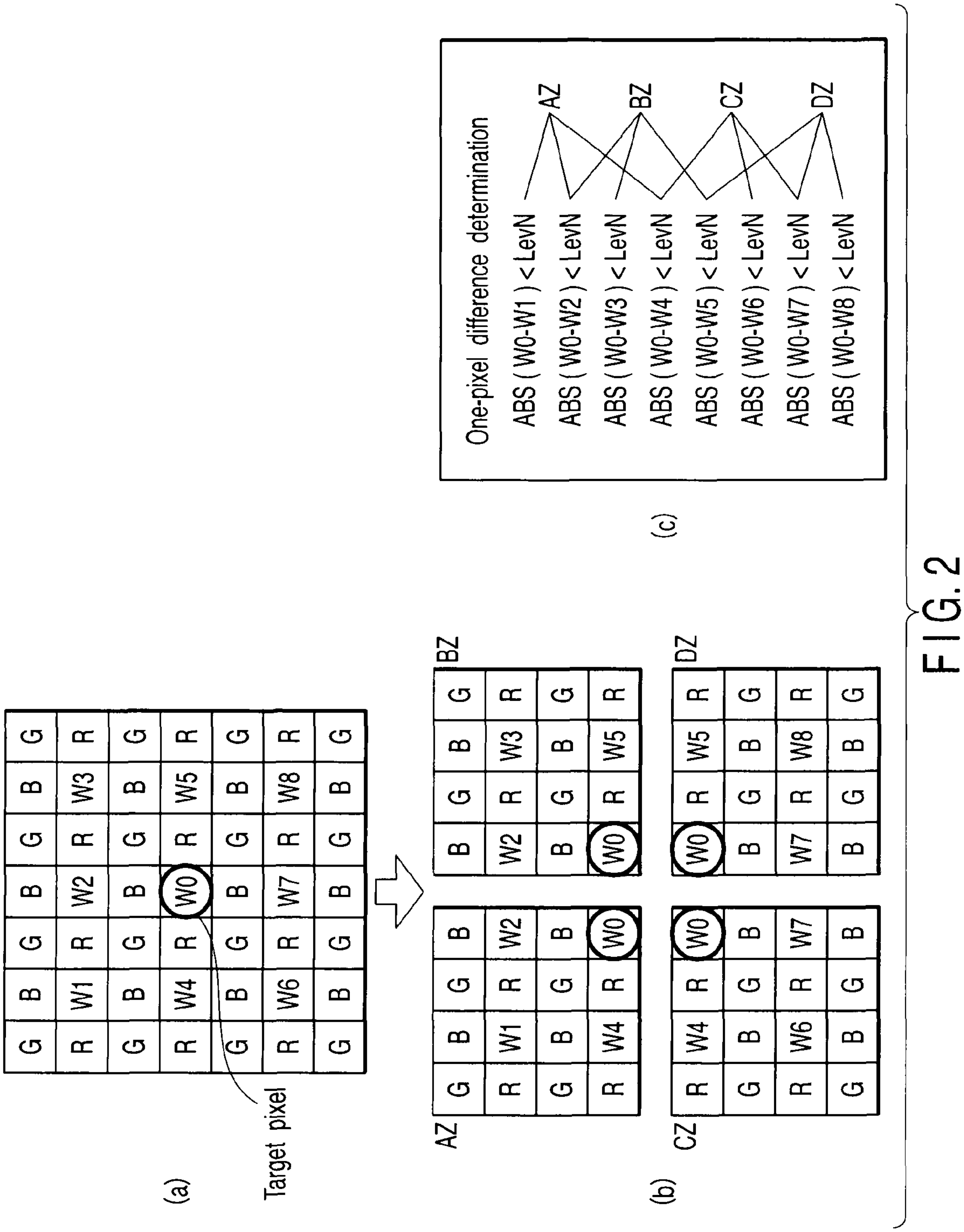
FIG. 2 is a diagram to help explain a processing method in the edge detection circuit of the signal generator circuit according to the first embodiment.

Hereinafter, referring to the accompanying drawings, a solid-state image pickup device including a CMOS image sensor according to an embodiment of the invention will be explained. In explanation, the same parts are indicated by the same reference numbers throughout the drawings.

First Embodiment

First, a solid-state image pickup device including a CMOS image sensor according to a first embodiment of the invention will be explained.

FIG. 1 is a block diagram schematically showing the configuration of the solid-state image pickup device according to the first embodiment. As shown in FIG. 1, the solid-state image pickup device comprises a sensor unit 11, a line memory 12, a signal generator circuit 13, a signal processing circuit 14, a system timing generator circuit (SG) 15, a command decoder 16, a serial interface 17, and a threshold level setting circuit 18.

The sensor unit 11 includes a pixel unit 111 and a column-type analog-to-digital converter (ADC) 112. In the pixel unit 111, pixels (cells) are arranged in rows and columns two-dimensionally. Each of the pixels is composed of, for example, a photodiode and a color filter. Above the photodiodes, W (white), R (red), G (green), and B (blue) color filters are provided. The W (white) filter is configured so as to allow RGB signals to pass through.

In the sensor unit 11, the four color filters of WRGB separate the light signal condensed by a lens 19 into WRGB light signals. A photodiode array arranged two-dimensionally converts the WRGB light signals into signal charge photoelectrically and outputs the signal charge (W signal and first R/G/B signals). The signal charge is converted by the column-type analog-to-digital converter (ADC) into a digital signal. The converted digital signal is output to the line memory 12. Then, seven vertical lines of the converted digital signal are stored in memory 1 to memory 7 of the line memory 12. The digital signals stored in memory 1 to memory 7 are input in parallel to the signal generator circuit 13.

In the signal generator circuit 13, the 7×7 pixel area of the pixel unit 111 is divided into four blocks each composed of 4×4 pixels having the central W pixel in common and the edge detection circuit 131 determines whether there is an edge of an image in each of the blocks. The determination is made by comparing the signal level of the pixels with a threshold level LevN taking a noise level into account. On the basis of the result of the determination made by the edge detection circuit 131, a block select unit 132 select a block with no edge from the four blocks. A ratio coefficient calculating unit 133 calculates the ratio coefficients of RGB signals from the block selected by the block select unit 132 and generates new signals Rw, Gw, Bw from the central pixel W0 (generating second R/G/B signals). Thereafter, using the generated signals Rw, Gw, Bw, a Bayer arrangement conversion unit 134 carries out a Bayer arrangement conversion process in which the signal-to-noise ratio is increased so as to enable a general signal process.

Thereafter, the signal processed at the Bayer arrangement conversion unit 134 is input to the signal processing circuit 14. The signal input to the signal processing circuit 14 is subjected to a white balance process, a color separation interpolating process, an edge enhancement process, a gamma correction process, and an RGB matrix, which produces YUV signals and RGB signals as outputs. While the signal processed at the Bayer arrangement conversion unit 134 is processed and output by the signal processing circuit 14 in the one-chip sensor, it may be output as it is processed at a special ISP (image signal processor). The operations of the sensor unit 11, line memory 12, signal generator circuit 13, and signal processing circuit are carried out on the basis of the signal output from the system timing generator circuit (SG) 15. A command may be controlled by data DATA input from the outside. Data DATA is input to the command decoder 16 via the serial interface 17. The decoded signal is input to the various circuits.

Next, a processing method in the edge detection circuit 131 of the signal generator circuit 13 in the first embodiment will be described.

FIG. 2 is a diagram to help explain a processing method in the edge detection circuit 131 of the signal generator circuit 13. The line memory 12 inputs 7×7 pixel signals to the edge detection circuit 131 as shown in (a) of FIG. 2. In the edge detection circuit 131, the central one of the 7×7 pixel, a W pixel, is set as target pixel W0 and the 7×7 pixel signals are separated into four blocks, with the central pixel W0 at the corners as shown in (b) of FIG. 2. Here, let the upper left block be block AZ, the upper right block be block BZ, the lower left be block CZ, and the lower right be block DZ.

Next, as shown in (c) of FIG. 2, the difference determining section of the edge detection circuit 131 carries out a one-pixel difference determining method. When the central pixel is W0, each of the absolute values of the differential signals W0-W1, W0-W2, W0-W3, W0-W4, W0-W5, W0-W6, W0-W7, and W0-W8 with W0 in the center is calculated. Moreover, it is determined whether or not each of the absolute values is smaller than the threshold level LevN set in the threshold level setting circuit 18. Then, an edge determining section ORs the three determinations belonging to the individual blocks and makes a final determination of whether there is any edge in the block. Specifically, of the three determinations of the individual blocks, if all of the absolute values are smaller than the threshold level LevN, it is determined that there is no edge in the block. If at least one of the absolute values is equal to or larger than the threshold level LevN, it is determined that there is an edge in the block. The signal used for the determination is not limited to a W signal and may be a G signal, an R signal, or a B signal. Using more than one of the WRGB signals enables the edge detection accuracy to be increased further.

FIG. 3 is a diagram to help explain another processing method in difference determination in a block. The difference determination is made by the difference determining section of the edge detection circuit 131. Explanation will be given using the upper left 4×4 pixel block AZ as an example as shown in (a) of FIG. 3.

First, a difference determining method using 2×2 pixels will be described. As shown in (b) of FIG. 3, it is determined whether a signal level obtained by calculating the difference between an addition signal of 2×2 pixels including W0 and an addition signal of another 2×2 pixels is lower than the threshold level LevN. Then, the three determinations are ORed and the result is used as the final determination of the block.

Next, a difference determining method using 3×3 pixels will be described. As shown in (c) of FIG. 3, it is determined whether or not a signal level obtained by calculating the difference between an addition signal of 3×3 pixels including W0 and another addition signal of 3×3 pixels is smaller than the threshold level LevN. This determination is set as the final determination of the block. In addition, a difference determination can be made by combining signals in 4×4 pixels freely. For example, a difference determination can be made even when an image signal in the block is at the corner, in a stripe, or on a slant. Using an addition signal of two or more pixels enables random noise to be reduced and high-accuracy determination to be made.

Figure 4:
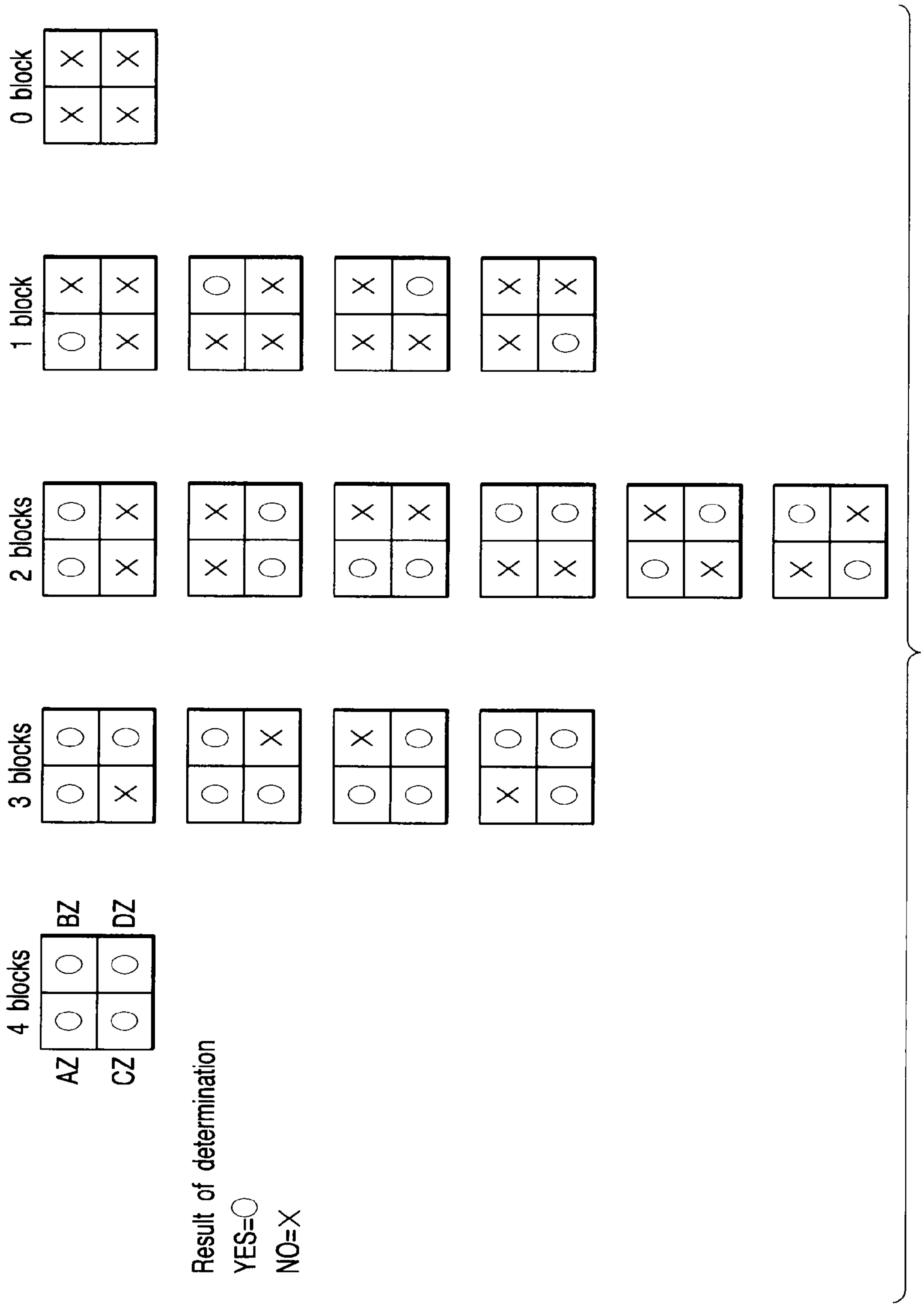
FIG. 4 is a diagram showing an example of determining blocks AZ to DZ at the edge detection circuit of the first embodiment.

FIG. 4 shows an example of determining block AZ to block DZ at the edge detection circuit 131. When the differential signal level is lower than the threshold level (YES), that is, when a case where there is no edge in a block is represented by ○ and the differential signal level is equal to or higher than the threshold level (NO), or when there is an edge in the block, this is represented by x. As shown in FIG. 4, each of the four blocks AZ to DZ is determined.

Next, explanation will be given about the process of calculating ratio coefficients and generating RGB signals from W0 signal for block AZ of 4×4 pixels at the top left.

FIG. 5 shows the process of calculating ratio coefficients and generating RGB signals from W0 signal for block AZ of 4×4 pixels. This is a processing method in a case where block AZ is selected on the basis of the result of the determination at the block select unit shown in FIG. 1.

Let the average value of R1, R2, R5, and R6 signals of four R pixels extracted from a 4×4 pixel array be Rave. Similarly, let the average value of G1, G2, G5, and G6 signals of four G pixels be Gave. Let the average value of B1, B2, B4, and B5 signals of four B pixels be Bave. Then, let the sum of Rave, Gave, and Bave be the average value of W (white) signal, which is represented by Wrgb. On the basis of the result of the calculation, new signals R0w, G0w, and B0w are generated from the signal from target pixel W0 using the following equations:

$$R0w=W0*(\text{Rave}/Wrgb)$$

$$G0w=W0*(\text{Gave}/Wrgb)$$

$$B0w=W0*(B\text{ave}/Wrgb)$$

Even when each of block BZ at the top right, block CZ at the bottom left, and block DZ at the bottom right is selected, calculation can be done similarly. This process is performed on the W pixels sequentially, thereby generating new signals Rw, Gw, and Bw from the individual W pixels.

FIG. 6 shows a Bayer arrangement converting method in selecting a block shown in FIG. 5. Since G0w signal generated from the signal from W0 pixel corresponds to the position of G pixel in the Bayer arrangement, G0w signal is converted directly into G0w. The signal-to-noise ratio of each of G6 pixel, B5 pixel, and R6 pixel adjacent to W0 pixel can be increased by adding the signal generated from W0 pixel. At G6 pixel, the signal-to-noise ratio of G6 can be increased by calculating the average of four pixels, G1w, G2w, G4w, and G0w generated from the surrounding W pixels and using the average value of the calculated average and G6 as G6w. Instead of simple average, adding less weight to G6 pixel enables the signal-to-noise ratio to be increased further. For example, the average value of G6 and five pixels, G1w, G2w, G4w, and G0w, can be used as G6w. Moreover, at R6 pixel, the signal-to-noise ratio can be increased by calculating the average of R4w and R0w on both sides and using the average value of the calculated average and R6 as new R6w. Similarly, at pixel B5, the signal-to-noise ratio can be increased by calculating the average of B2w and B0w above and below and using the average value of the calculated average and B5 as new B5w. As with G6w, adding weight to R6w and B5w in an averaging process makes it possible to control the signal-to-noise ratio and resolution.

FIG. 7 shows an example of selecting two blocks AZ and BZ in (b) of FIG. 2. The process of calculating ratio coefficients and generating RGB signals from W0 signal using upper two blocks of 4×7 pixels in the 7×7 pixels as representatives will be described. Let the average value of eight R pixels extracted from the 4×7 pixel array be Rave. Similarly, let the average value of eight G pixels be Gave. Let the average value of six B pixels be Bave. Then, let the sum of Rave, Gave, and Bave be the average value of W (white) signal, which is represented by Wrgb. On the basis of the result of the calculation, new signals R0w, G0w, and B0w are generated from the signal from target pixel W0 using the following equations:

$$R0w=W0*(\text{Rave}/Wrgb)$$

$$G0w=W0*(\text{Gave}/Wrgb)$$

$$B0w=W0*(B\text{ave}/Wrgb)$$

Even when other two blocks are selected, signal R0w, signal G0w, and signal B0w can be calculated similarly. This process is performed on the W pixels sequentially, thereby generating new signals Rw, Gw, and Bw from the individual W pixels.

FIG. 8 shows a Bayer arrangement converting method in selecting a block shown in FIG. 7. In FIG. 8, G7 and R7 are added to FIG. 6. At G7 pixel, the signal-to-noise ratio of G7 can be increased by calculating the average of four pixels, G2w, G3w, G0w, and G5w, generated from the surrounding W pixels and using the average value of the calculated average and G7 as G7w. Instead of simple average, averaging with a weight of G7 pixel makes it possible to generate new G7w. Moreover, at R7 pixel, the signal-to-noise ratio can be increased by calculating the average of R0w and R5w on both sides and using the average value of the calculated average and R7 as new R7w. R7w can also be calculated by adding weight in an averaging process.

FIG. 9 shows an example of selecting two blocks AZ and DZ located diagonally in (b) of FIG. 2. The process of calculating ratio coefficients and generating RGB signals from W0 signal using two blocks of 4×7 pixels at the top left and at the bottom right as representatives will be described. Let the average value of eight R pixels extracted from a total of 31 pixel arrangements be Rave. Similarly, let the average value of eight G pixels be Gave. Let the average value of eight B pixels be Bave. Then, let the sum of Rave, Gave, and Bave be the average value of W (white) signal, which is represented by Wrgb. On the basis of the result of the calculation, new signals R0w, G0w, and B0w are generated from the signal from target pixel W0 using the following equations:

$$R0w=W0*(\text{Rave}/Wrgb)$$

$$G0w=W0*(\text{Gave}/Wrgb)$$

$$B0w=W0*(B\text{ave}/Wrgb)$$

Even when other two blocks located diagonally on the opposite side are selected, signal R0w, signal G0w, and signal B0w can be calculated similarly. This process is performed on the W pixels sequentially, thereby generating new signals Rw, Gw, and Bw from the individual W pixels.

Figure 10:
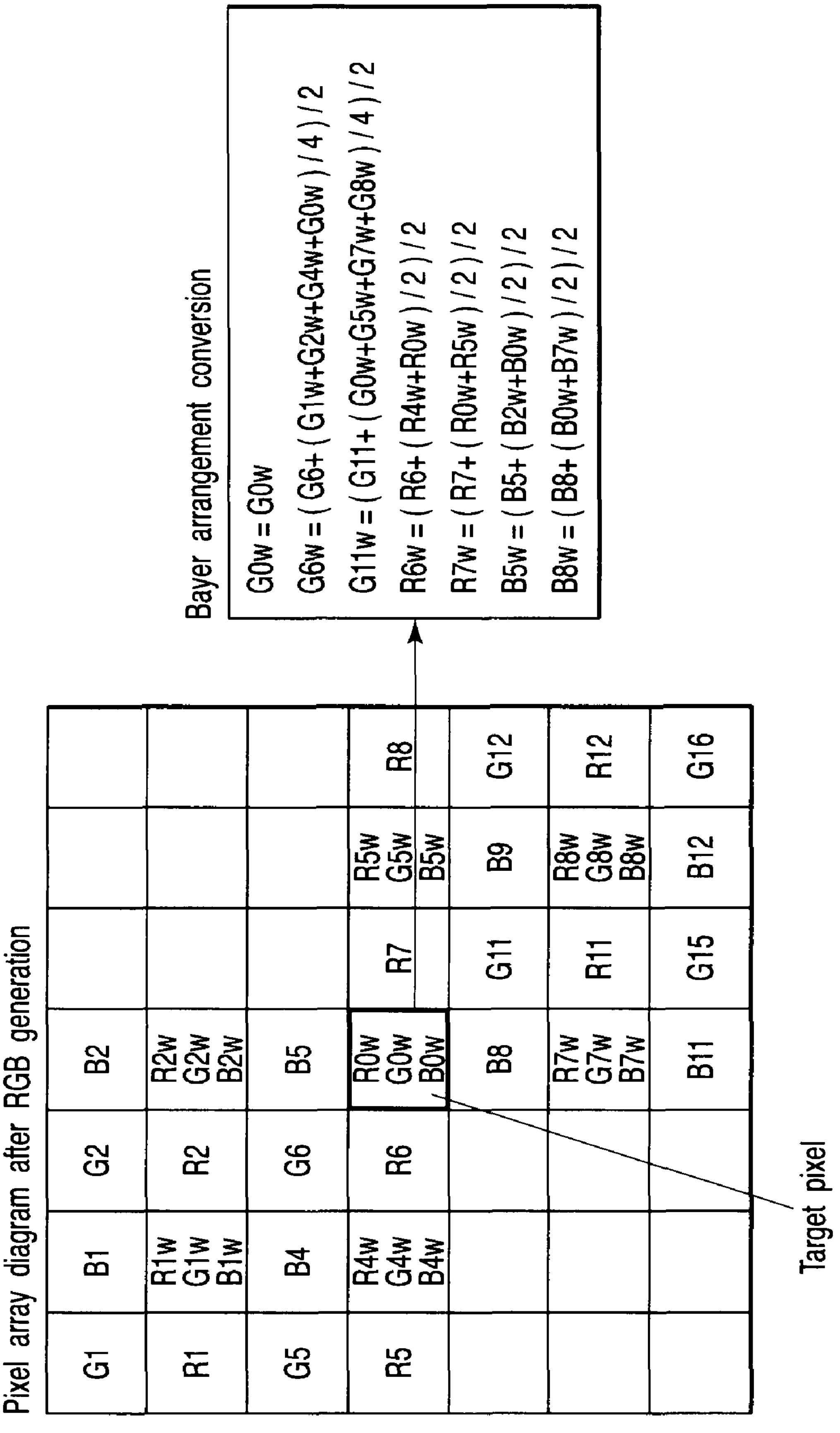
FIG. 10 is a diagram to help explain a method of converting into Bayer arrangements in selecting a block shown in FIG. 9.

FIG. 10 shows a Bayer arrangement converting method in selecting a block shown in FIG. 9. In FIG. 10, B8, G11, and R7 are added to FIG. 6. At G11 pixel, the signal-to-noise ratio of G11 can be increased by calculating the average of four pixels, G0w, G5w, G7w, and G8w, generated from the surrounding W pixels and using the average value of the calculated average and G11 as G11w. Instead of simple average, averaging with a weight of G11 pixel makes it possible to generate new G11w. Moreover, at R7 pixel, the signal-to-noise ratio can be increased by calculating the average of R0w and R5w on both sides and using the average value of the calculated average and R7 as new R7w. At B8 pixel, the signal-to-noise ratio can be increased by calculating the average of B02 and B7w above and below and using the average value of the calculated average and B8 as new B8w. R7w and B8w can also be calculated by adding weight in an averaging process.

Figure 11:
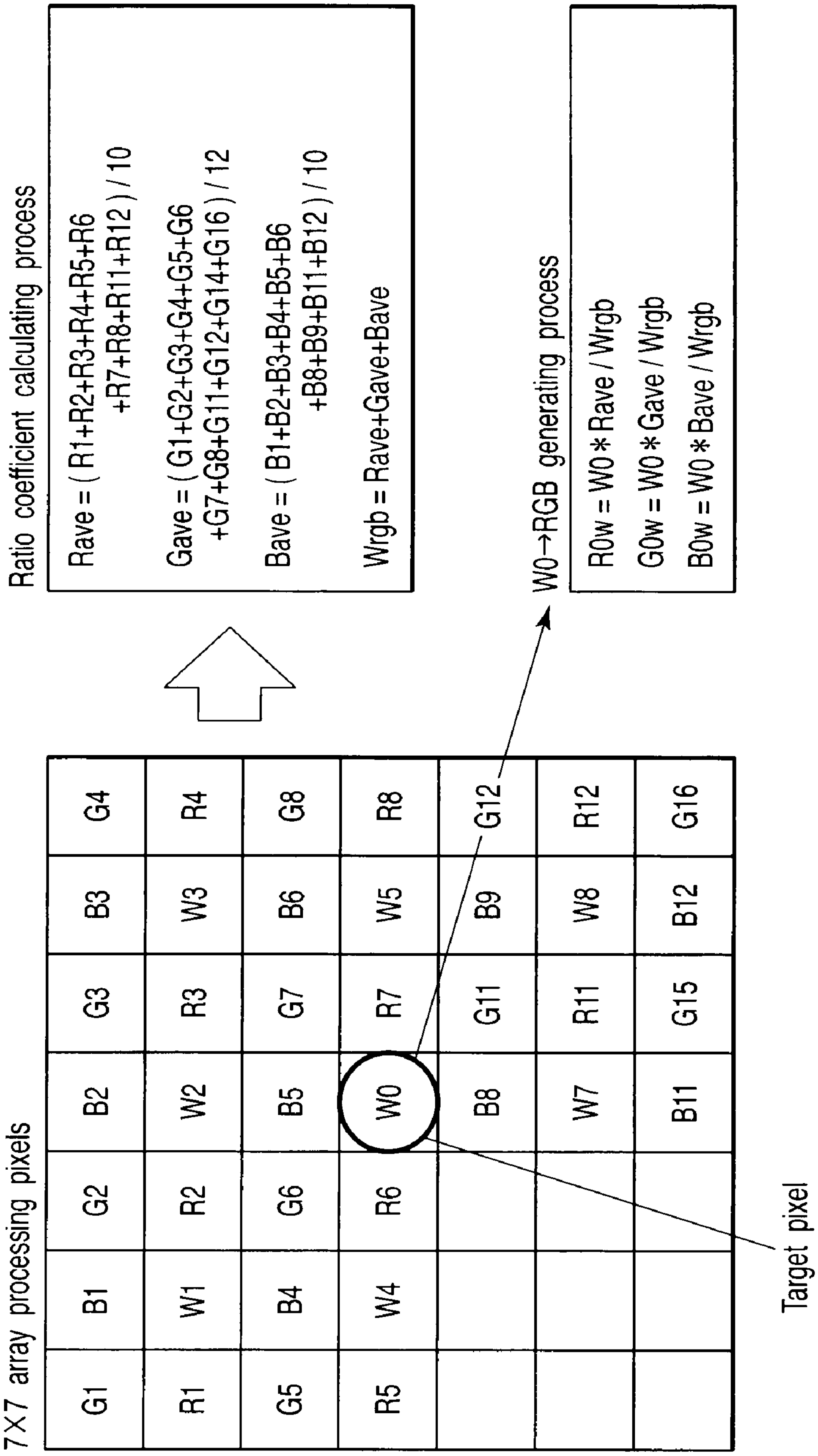
FIG. 11 shows a case where three blocks AZ, BZ, and DZ at the corners are selected in (b) of FIG. 2.

FIG. 11 shows an example of selecting three blocks AZ, BZ, DZ at the corners in (b) of FIG. 2. The process of calculating ratio coefficients and generating RGB signals from W0 signal using three blocks at the top left, at the top right, and at the bottom right as representatives will be described. Let the average value of ten R pixels extracted from a total of 40 pixel arrangements be Rave. Similarly, let the average value of 12 G pixels be Gave. Let the average value of ten B pixels be Bave. Then, let the sum of Rave, Gave, and Bave be the average value of W (white) signal, which is represented by Wrgb. On the basis of the result of the calculation, new signals R0w, G0w, and B0w are generated from the signal from target pixel W0 using the following equations:

$$R0w=W0*(Rave/Wrgb)$$

$$G0w=W0*(Gave/Wrgb)$$

$$B0w=W0*(Bave/Wrgb)$$

Even when other three blocks are selected, signal R0w, signal G0w, and signal B0w can be calculated similarly. This process is performed on the W pixels sequentially, thereby generating new signals Rw, Gw, and Bw from the individual W pixels.

Figure 12:
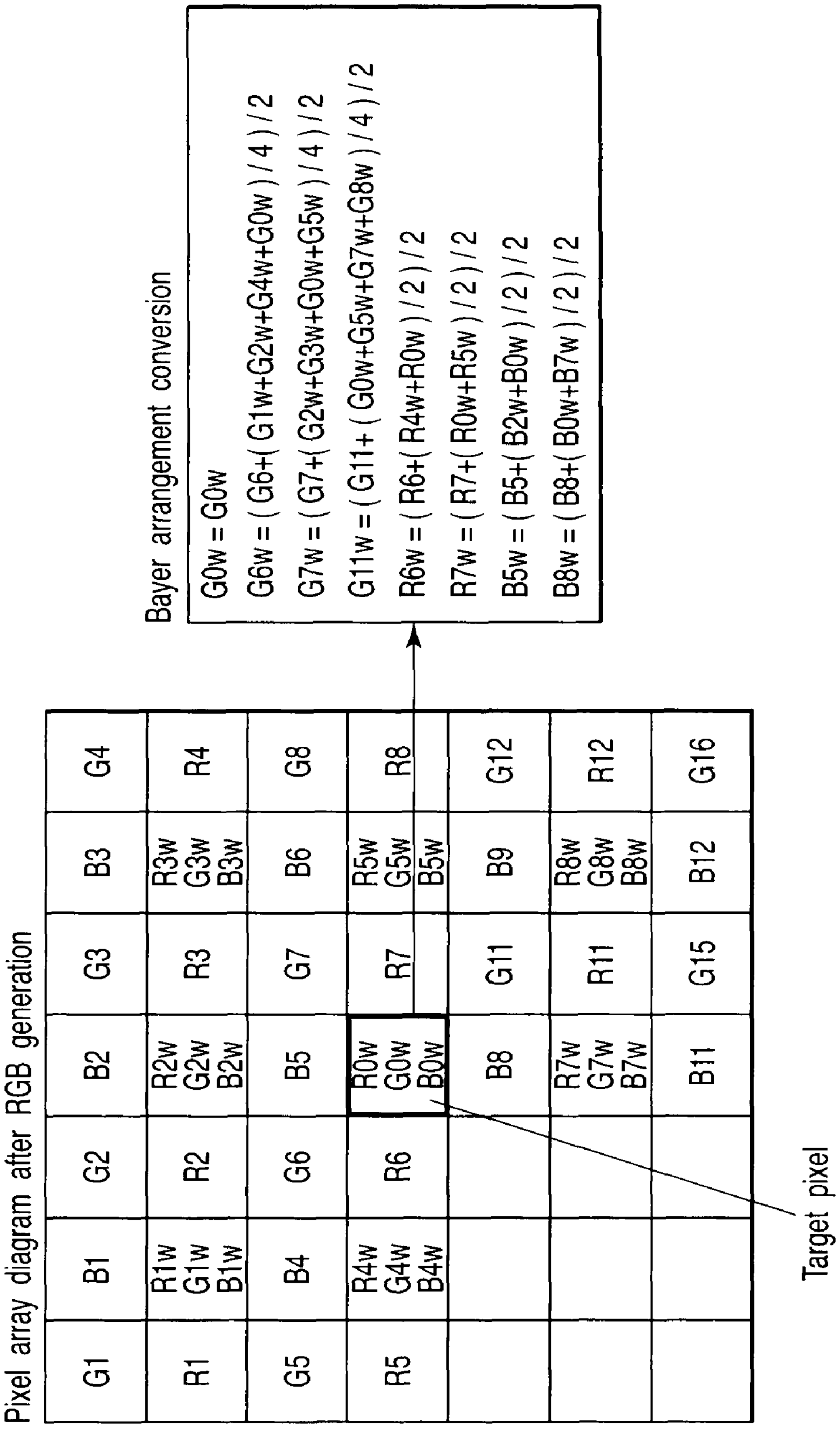
FIG. 12 is a diagram to help explain a method of converting into Bayer arrangements in selecting a block shown in FIG. 11.

FIG. 12 shows a Bayer arrangement converting method in selecting a block shown in FIG. 11. In FIG. 12, G7 is added to FIG. 10. At G7 pixel, the signal-to-noise ratio of G7 can be increased by calculating the average of four pixels, G2w, G3w, G0w, and G5w, generated from the surrounding W pixels and using the average value of the calculated average and G7 as G7w. Instead of simple average, averaging with a weight of G7 pixel makes it possible to generate new G7w.

Figure 13:
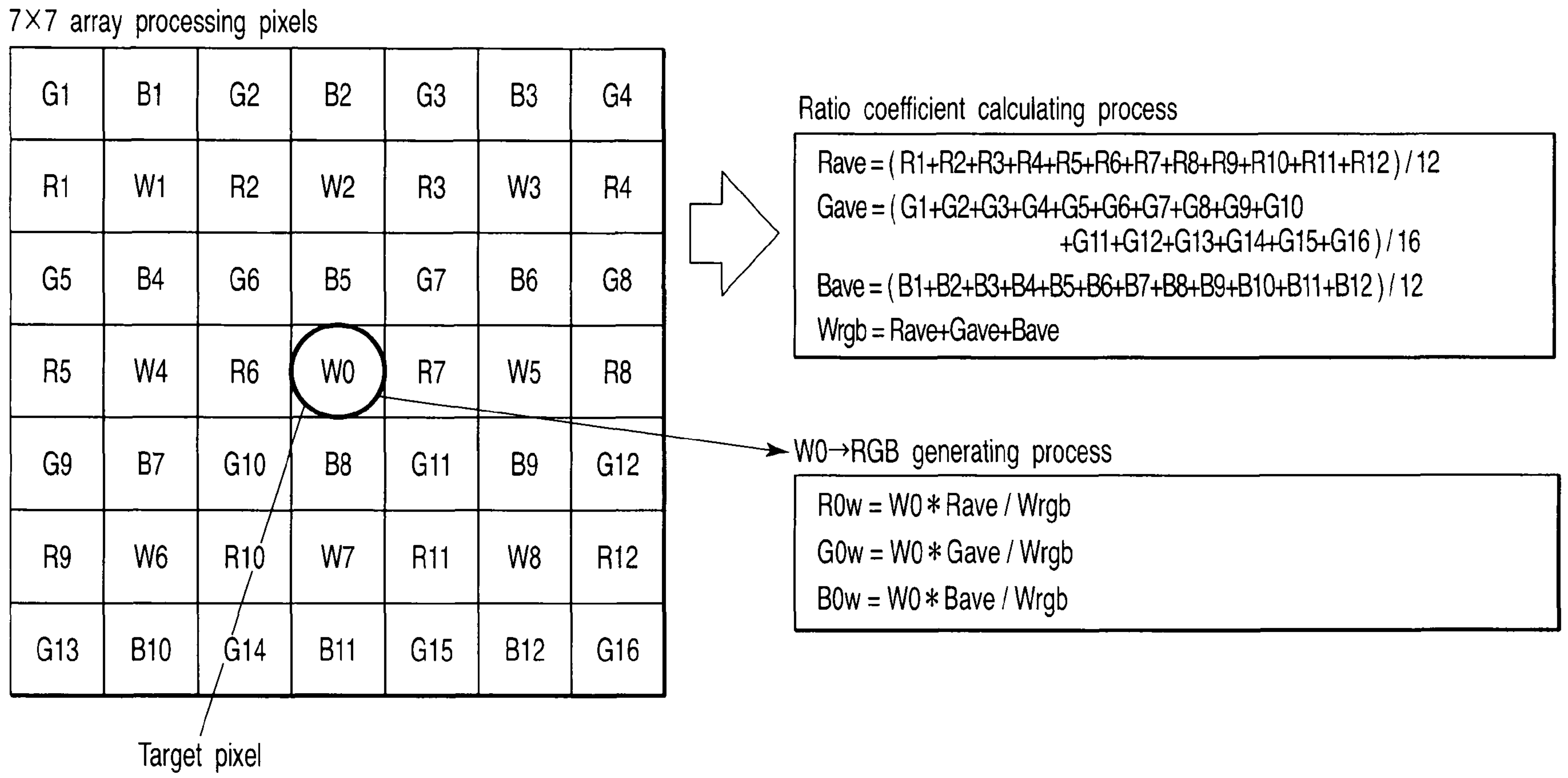
FIG. 13 shows a case where four blocks are selected in (b) of FIG. 2.

FIG. 13 shows an example of selecting four blocks in (b) of FIG. 2. Let the average value of 12 R pixels extracted from a total of 49 pixel arrangements be Rave. Similarly, let the average value of 16 G pixels be Gave. Let the average value of 12 B pixels be Bave. Then, let the sum of Rave, Gave, and Bave be the average value of W (white) signal, which is represented by Wrgb. On the basis of the result of the calculation, new signals R0w, G0w, and B0w are generated from the signal from target pixel W0 using the following equations:

$$R0w=W0*(Rave/Wrgb)$$

$$G0w=W0*(Gave/Wrgb)$$

$$B0w=W0*(Bave/Wrgb)$$

FIG. 14 shows a Bayer arrangement converting method in selecting a block shown in FIG. 13. In FIG. 14, G10 is added to FIG. 12. At G10 pixel, the signal-to-noise ratio of G10 can be increased by calculating the average of four pixels, G4w, G0w, G6w, and G7w, generated from the surrounding W pixels and using the average value of the calculated average and G10 as G10w. Instead of simple average, averaging with a weight of G10 pixel makes it possible to generate new G10w.

The processing method shown in FIGS. 13 and 14 can be applied to a case where the result of the determination at the edge detection circuit 131 has shown 0 block, that is, a case where the number of blocks having no edge is 0. When the result of the determination has shown 0 block, this means that the signal levels of the 7×7 pixels differ from one another. However, the average value of the signals of the same color in the 7×7 pixels is calculated and then the ratio of the average value to W0 signal is calculated, which enables new signals Rw, Gw, and Bw to be generated. When signal-to-noise ratio is given priority, the surrounding pixels of W0 are replaced with the additive average of Rw, Gw, and Bw signals. When resolution is given priority, only G0w signal may be used without additive average.

As described above, according to the first embodiment, a signal with less reduction of resolution can be generated by detecting and determining an edge in four blocks when RGB signals are generated from W pixels at a ratio multiplying circuit, selecting a block with no edge, and generating new RGB signals from the selected block by a ratio multiplying process. As a result, it is possible to provide a high-sensitivity image sensor capable of alleviating the reduction of resolution.

Second Embodiment

Next, a solid-state image pickup device including a CMOS image sensor according to a second embodiment of the invention will be explained. In the second embodiment, a line memory has five lines and the pixel processing range is 5×5 pixels. The remaining configuration and effect are the same as those in the first embodiment. The same parts as those in the first embodiment are indicated by the same reference numbers and explanation of them will be omitted.

Figure 15:
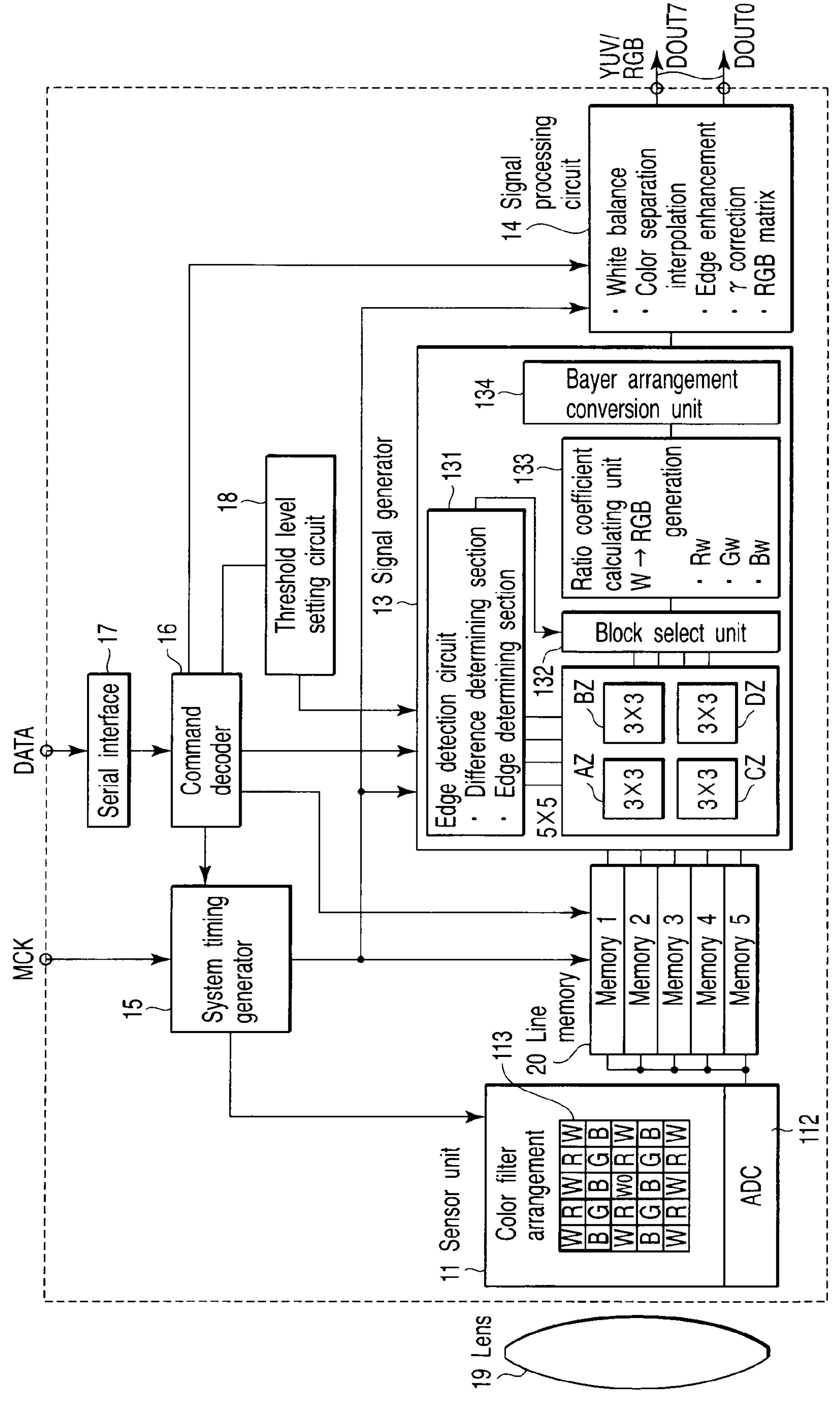
FIG. 15 is a block diagram schematically showing the configuration of a solid-state image pickup device according to a second embodiment of the invention.

FIG. 15 is a block diagram schematically showing the configuration of a solid-state image pickup device according to the second embodiment. A sensor unit 11 includes a 5×5 pixel unit 113. The signal charge obtained at the pixel unit 113 is converted into a digital signal by a column-type analog-to-digital converter (ADC). The converted digital signal is output to a line memory 20. Then, five vertical lines of digital signal are stored into memory 1 to memory 5 in the line memory 20. The digital signals stored in the memory 1 to memory 5 are input in parallel to a signal generator circuit 13. In the signal generator circuit 13, the 5×5 pixel area of the pixel unit 113 is divided into four blocks each composed of 3×3 pixels having the central W pixel in common and an edge detection circuit 131 determines whether there is an edge of an image in each of the blocks. The subsequent processes are the same as those in the first embodiment.

Hereinafter, a processing method in the edge detection circuit of the signal generator circuit according to the second embodiment will be described.

FIG. 16 is a diagram to help explain a processing method in the edge detection circuit of the signal generator circuit 13. The line memory 20 inputs 5×5 pixel signals as shown in (a) of FIG. 16 to the edge detection circuit 131. With the central W pixel in the 5×5 pixels as W0, the edge detection circuit 131 divides the 5×5 pixel signals into four blocks each having central pixel W0 at the corner as shown in (b) of FIG. 16. As in the first embodiment, let the block at the top left be block AZ, the block at the top right be block BZ, the block at the bottom left be block CZ, and the block at the bottom right be block DZ.

Next, as shown in (c) of FIG. 16, the difference determination unit of the edge detection circuit 131 carries out a one-pixel difference determining method. When the central pixel is W0, the absolute value of each of W0-W1, W0-W2, W0-W3, W0-W4, W0-W5, W0-W6, W0-W7, and W0-W8 is calculated. Moreover, it is determined whether each of the absolute values is smaller than the threshold level LevN set in the threshold level setting circuit 18. Three determinations belonging to the respective blocks are ORed, thereby finally determining whether there is an edge in the block. The signal used in the determination is not limited to a W signal. For instance, a G signal, an R signal, or a B signal may be used. Use of these signals in combination enables the edge detection accuracy to be increased further.

FIG. 17 is a diagram to help explain another processing method in difference determination in a block. Explanation will be given using the 3×3 pixel block AZ at the top left as an example as shown in (a) of FIG. 17.

First, a two-pixel difference determining method will be described. As shown in (b) of FIG. 17, two pixels symmetrical with respect to D5 pixel are selected and it is determined whether the signal level obtained by calculating the difference between the addition signals of the selected two pixels is smaller than the threshold level LevN. Then, four determinations are ORed, thereby making a final determination of the block.

Next, a three-pixel stripe difference determining method will be described. As shown in (c) of FIG. 17, three pixels arranged in a stripe symmetrically with respect to D5 pixel are selected and it is determined whether the signal level obtained by calculating the difference between the addition signals of the selected three pixels is smaller than the threshold level LevN. Then, two determinations are ORed, thereby making a final determination of the block.

Furthermore, there are a three-pixel L difference determining method as shown in (d) of FIG. 17 and a four-pixel difference determining method as shown in (e) of FIG. 17. As described above, a difference determination can be made by combining the signals in the 3×3 pixels freely. Use of the addition signals of two or more pixels makes it possible to reduce random noise and therefore make a high-accuracy determination.

Third Embodiment

In a third embodiment of the invention, explanation will be given about a processing method in the edge detection circuit in a case where the color filter arrangement of the sensor unit 11 differs from that in the first embodiment. In this case, a 4×4 pixel array constituting a block differs from that in the first embodiment. The remaining configuration and effect are the same as those in the first embodiment. The same parts are indicated by the same reference numbers and explanation of them will be omitted.

Figure 18:
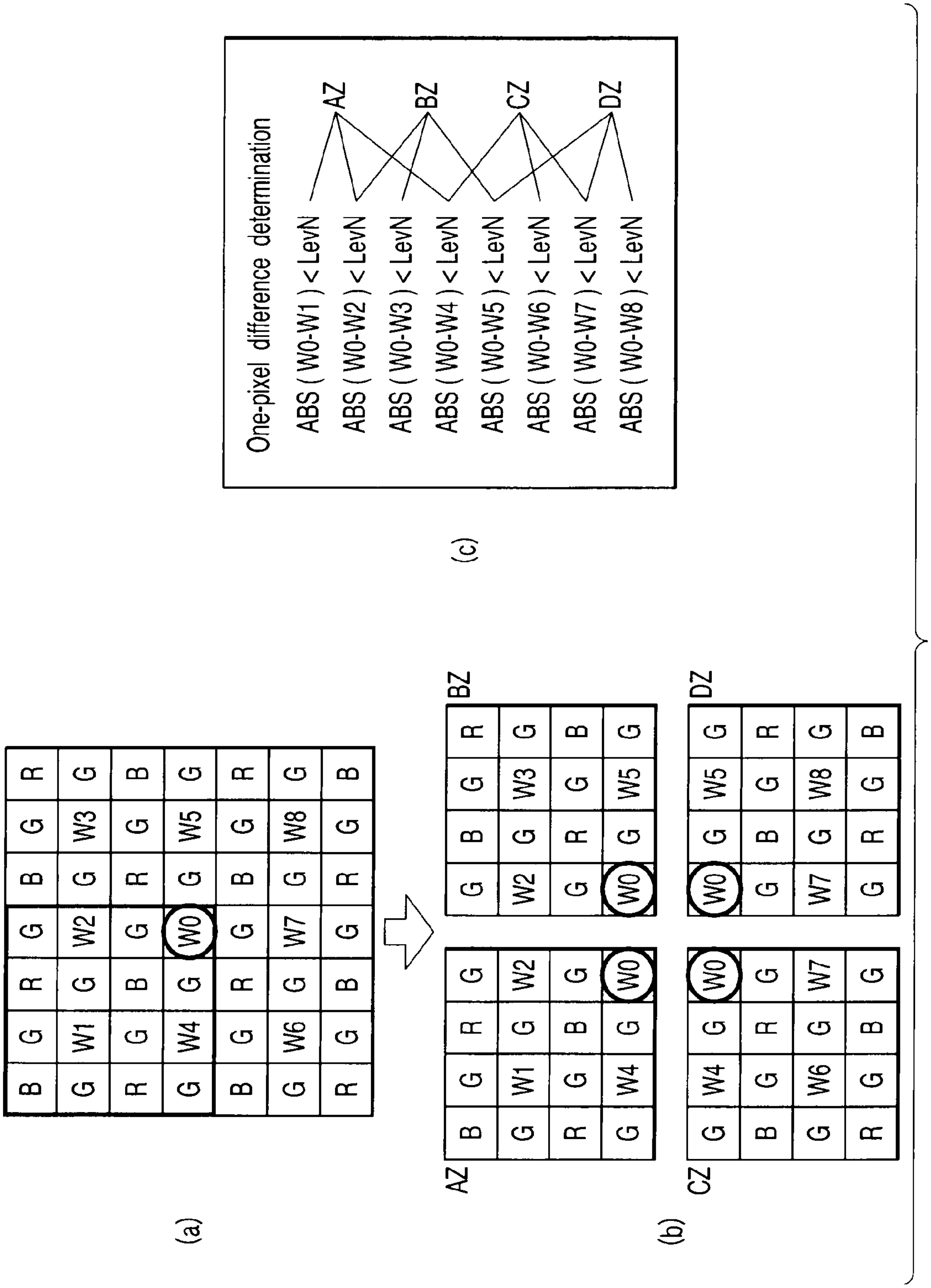
FIG. 18 is a diagram to help explain a processing method in the edge detection circuit of the signal generator circuit according to a third embodiment of the invention.

FIG. 18 is a diagram to help explain a processing method in the edge detection circuit of the signal generator circuit 13 according to the third embodiment. The line memory 20 inputs 7×7 pixel signals as shown in (a) of FIG. 18 to the edge detection circuit 131. With the central W pixel in the 7×7 pixels as target pixel W0, the edge detection circuit 131 divides the 7×7 pixel signals into four blocks each having central pixel W0 at the corner as shown in (b) of FIG. 18. As described above, let the block at the top left be block AZ, the block at the top right be block BZ, the block at the bottom left be block CZ, and the block at the bottom right be block DZ. In the 4×4 pixel array constituting each of the blocks, eight G pixels, four W pixels, two R pixels, and two B pixels are arranged.

Next, as shown in (c) of FIG. 18, the difference determining section of the edge detection circuit 131 carries out a one-pixel difference determining method. When the central pixel is W0, the absolute value of each of W0-W1, W0-W2, W0-W3, W0-W4, W0-W5, W0-W6, W0-W7, and W0-W8 is calculated. Moreover, it is determined whether each of the absolute values is smaller than the threshold level LevN set in the threshold level setting circuit 18. Three determinations belonging to the respective blocks are ORed, thereby finally determining whether there is an edge in the block. The signal used in the determination is not limited to a W signal. For instance, a G signal, an R signal, or a B signal may be used. Use of two or more of the WRGB signals in combination enables the edge detection accuracy to be increased further.

FIG. 19 is a diagram to help explain another processing method in difference determination in a block. The difference determination is made by the difference determining section of the edge detection circuit 131. Explanation will be given using the 4×4 pixel block AZ as at the top left an example as shown in (a) of FIG. 19.

First, a two-pixel difference determining method will be described. As shown in (b) of FIG. 19, it is determined whether the signal level obtained by calculating the difference between the addition signal of two pixels including W0 and the addition signal of other two pixels is smaller than the threshold level LevN. Then, three determinations are ORed, thereby making a final determination of the block.

Next, a three-pixel difference determining method will be described. As shown in (c) of FIG. 19, it is determined whether the signal level obtained by calculating the difference between the addition signal of three pixels including W0 and the addition signal of other three pixels is smaller than the threshold level LevN. Then, three determinations are ORed, thereby making a final determination of the block. Furthermore, a difference determination can be made by combining the signals in the 4×4 pixels freely. Use of the addition signals of two or more pixels makes it possible to reduce random noise and therefore make a high-accuracy determination.

Fourth Embodiment

In a fourth embodiment of the invention, explanation will be given about a processing method in the edge detection circuit in a case where the color filter arrangement of the sensor unit 11 differs from that in each of the first and third embodiments. In this case, a 4×4 pixel array constituting a block differs from that in each of the first and third embodiments. The remaining configuration and effect are the same as those in the first embodiment. The same parts are indicated by the same reference numbers and explanation of them will be omitted.

Figure 20:
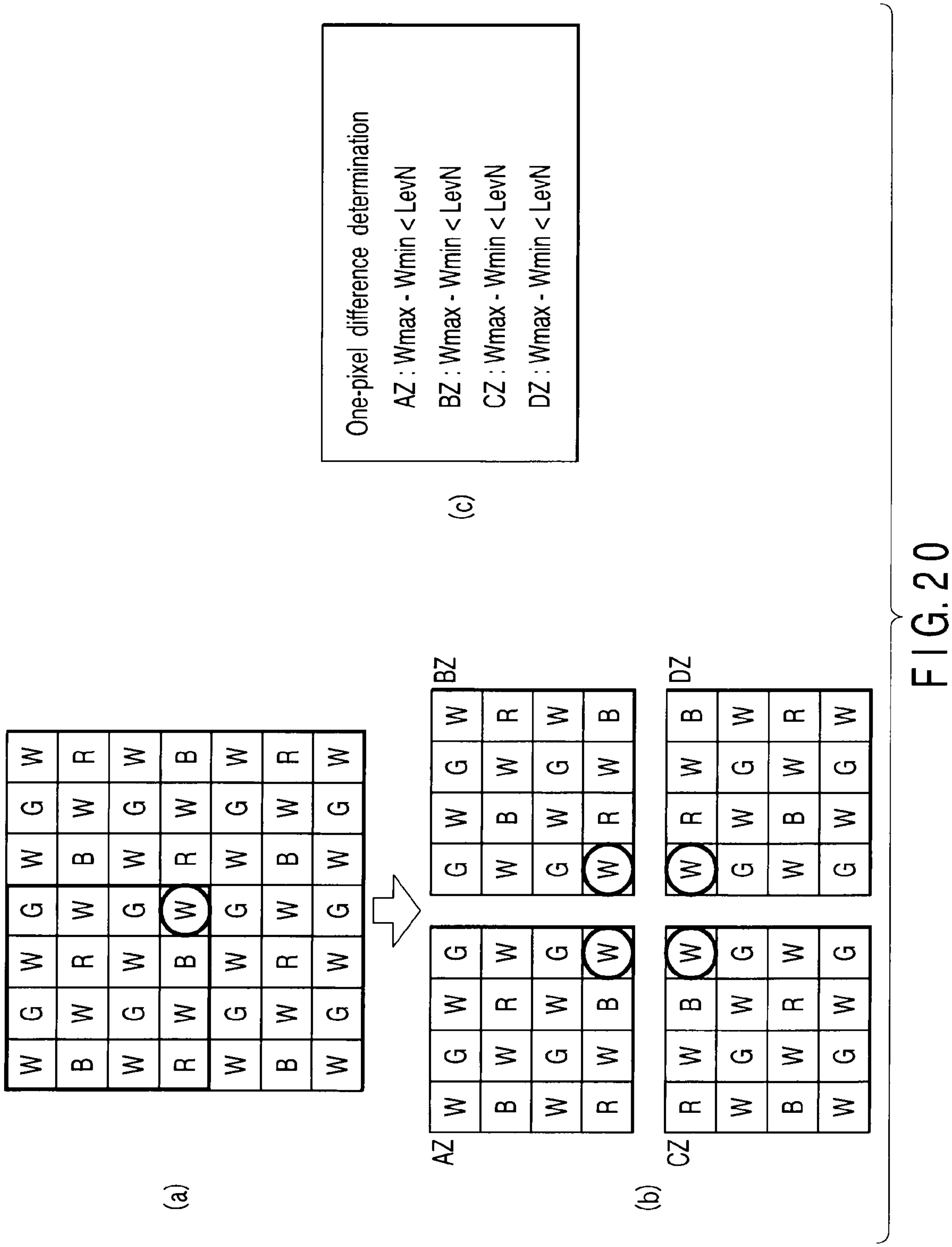
FIG. 20 is a diagram to help explain a processing method in the edge detection circuit of the signal generator circuit according to a fourth embodiment of the invention.

FIG. 20 is a diagram to help explain a processing method in the edge detection circuit of the signal generator circuit according to the fourth embodiment. The line memory 12 inputs 7×7 pixel signals as shown in (a) of FIG. 20 to the edge detection circuit 131. With the central W pixel in the 7×7 pixels as target pixel W0, the edge detection circuit 131 divides the 7×7 pixel signals into four blocks each having central pixel W0 as the corner as shown in (b) of FIG. 20. As described above, let the block at the top left be block AZ, the block at the top right be block BZ, the block at the bottom left be block CZ, and the block at the bottom right be block DZ. In the 4×4 pixel array constituting each of the blocks, four G pixels, eight W pixels, two R pixels, and two B pixels are arranged.

Next, as shown in (c) of FIG. 20, the difference determination unit of the edge detection circuit 131 carries out a one-pixel difference determining method. The maximum value Wmax and minimum value Wmin of a W signal are obtained as variations in the W pixels in each block and then "Wmax−Wmin" is calculated. Then, it is determined whether "Wmax−Wmin" in each block is smaller than the threshold level LevN. If "Wmax−Wmin" is smaller than the threshold level LevN, it is determined that there is no edge in the block.

If "Wmax−Wmin" in each block is equal to or larger than the threshold level LevN, it is determined that there is an edge in the block. The signal used in the determination is not limited to a W signal. For instance, a G signal, an R signal, or a B signal may be used to make a determination on the basis of the difference between signals of the same color. Use of two or more of the WRGB signals in combination enables the edge detection accuracy to be increased further.

FIG. 21 is a diagram to help explain another processing method in difference determination in a block. The difference determination is made by the difference determining section of the edge detection circuit 131. Explanation will be given using the 4×4 pixel block AZ as at the top left an example as shown in (a) of FIG. 21.

First, a two-pixel difference determining method will be described. As shown in (b) of FIG. 21, it is determined whether the signal level obtained by calculating the difference between the addition signal of two pixels including W0 and the addition signal of other two pixels is smaller than the threshold level LevN. Then, three determinations are ORed, thereby making a final determination of the block.

Next, a three-pixel difference determining method will be described. As shown in (c) of FIG. 21, it is determined whether the signal level obtained by calculating the difference between the addition signal of three pixels including W0 and the signal level of other three pixels is smaller than the threshold level LevN. Then, three determinations are ORed, thereby making a final determination of the block. Moreover, a difference determination can be made using combinations other than those shown in (b) and (c) of FIG. 21. Furthermore, increasing the number of determinations ORed enables the accuracy of the result of the determination to be increased. Use of the addition signals of two or more pixels makes it possible to reduce random noise and therefore make a high-accuracy determination.

Other examples are listed below.

When the number of selected blocks is 2 to 4 and 0, the processing method is changed according to the number of selected blocks. However, to reduce the number of circuits, the signals Rw, Gw, and Bw obtained from the processing of one block in FIG. 5 may be calculated for each block and the average value of the signals Rw, Gw, and Bw may be used according to the number of selected blocks. Alternatively, new signals Rw, Gw, and Bw may be generated from the average value of Gave, Rave, Bave, and Vrgb of four blocks and W0 signal. Moreover, when the block select unit 132 selects a block with no edge, the differential signals of the four blocks may be compared with one another to select only one block with the smallest differential signal and then signals Rw, Gw, and Bw may be generated.

The embodiments may be applied to a color filter arrangement using another white (W). Moreover, the block size (or the number of pixels included in a block) can be set freely. In addition, the embodiments are not limited to a CMOS image sensor and may be applied to another CCD image sensor or a stacked image sensor. Furthermore, the embodiments may be applied to a special image signal processor (ISP).

Figure 22:
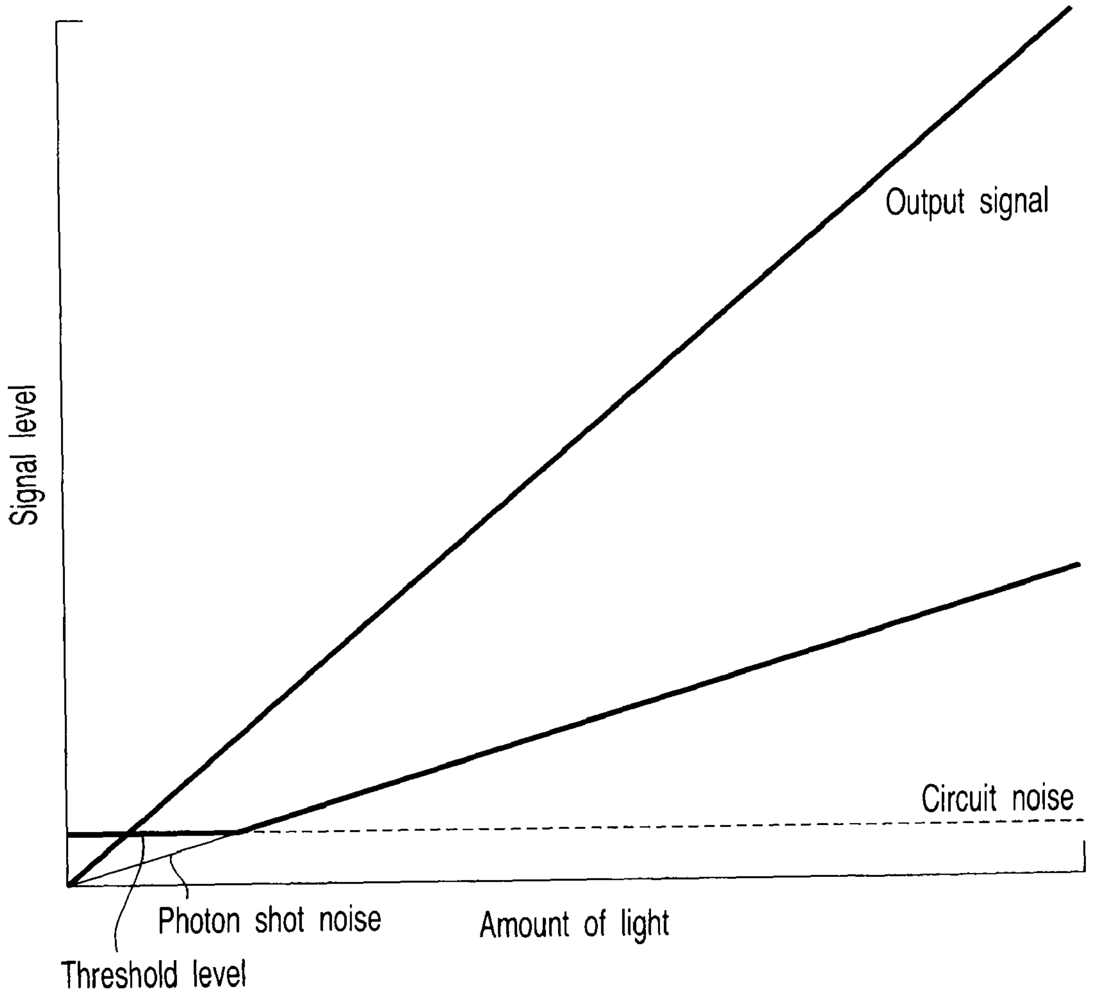
FIG. 22 is a diagram to help explain the photoelectric conversion characteristic and threshold level of the sensor unit of the embodiments.

Hereinafter, a method of setting the threshold level LevN in the threshold level setting circuit 18 in the embodiments will be described. FIG. 22 is a diagram to help explain the photoelectric conversion characteristic and threshold level of the sensor unit 11. As the amount of light incident the sensor unit 11 increases, the output signal from the sensor unit 11 increases. An increase in the output signal results in an increase in photon shot noise. Photon shot noise develops in proportion to the square root of the amount of photon. FIG. 22 is a diagram to help explain the photoelectric conversion characteristic of the sensor unit 11. When the incident light incident the sensor unit 11 is low in amount, circuit noise is more predominant than photon shot noise. Thus, the value of the threshold level LevN taking noise level into account is set as the value taking circuit noise into account when the amount of light is small. When the amount of light is large, control is performed so as to increase the amount according to photon shot noise. Such control makes it possible to suppress random noise effectively. The luminance signal is generated according to the following equation: $Y=0.59G+0.3R+0.11B$. Therefore, the threshold level LevN is set larger at the time of the process of suppressing R and B noise making a minor contribution to the luminance signal, which increases the effect of suppressing R and B random noise.

Furthermore, when the threshold level LevN is set so as to meet the white balance gain ratio according to the amount of each of the RGB signals, this gives more effect. When a shading correction is made according to the optical characteristic of the lens, the signal is amplified more with a digital gain as the correcting position is closer to the left, right, top, bottom, and corner of the screen with respect to the center of the screen. Consequently, random noise at the left, right, top, bottom, and corner increases. To overcome this problem, increasing the threshold level LevN according to the gain at the left, right, top, bottom, and corner enables the noise suppressing effect to be made greater and the image quality to be increased. As described above, the threshold level LevN is changed suitably according to the amount of signal, the position of the screen, color information, or gain information, which enables much higher image quality.

Since the ratio of RGB signals is calculated from a wideband image signal in a solid-state image pickup device with WRGB color filters, the edges of the newly generated RGB signals might blur when RGB signals are newly generated from the W pixel using the ratio. In the embodiments of the invention, to overcome the above problem, the image is divided into four blocks each having the central pixel as the corner, an edge determination is made for each block, and RGB signals are generated from the W pixel using a block with no edge, thereby increasing the edge resolution.

According to the embodiments of the invention, it is possible to provide a solid-state image pickup device capable of not only increasing the sensitivity and signal-to-noise ratio by a signal process using a W signal obtained from a white (W) pixel but also alleviating the reduction of the resolution.

Furthermore, the above embodiments can be implemented not only independently but also in a suitable combination. The embodiments include inventions of different stages and therefore inventions of various stages can be extracted by combining suitably a plurality of component elements disclosed in the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image pickup device comprising: a pixel unit in which W pixels, R pixels, G pixels, and B pixels are arranged in rows and columns two-dimensionally, the W pixels, R pixels, G pixels, and B pixels each having photoelectric conversion elements provided with a white (W) filter, a red (R) filter, a green (G) filter, and a blue (B) filter respectively and which outputs W signals, R signals, G signals, and B signals obtained by photoelectrically converting light incident on the W pixels, R pixels, G pixels, and B pixels; an edge detection unit which determines a specific area having a W pixel provided with a white (W) filter as a central pixel in the pixel unit, divides the specific area into a plurality of blocks including the central pixel, and detects edge information as to whether there is an edge of an image in each of the blocks, at least one of the blocks including the central pixel at an end of the block; a block select unit which selects a block with no edge from the edge information detected by the edge detection unit; a ratio calculating unit which calculates ratio coefficients of the R signals, G signals, and B signals from the block selected by the block select unit; and an RGB signal generator unit which generates a new R signal, G signal, and B signal from the W signal of the central pixel using the ratio coefficients calculated by the ratio calculating unit, wherein the ratio calculating unit calculates an additive average value obtained by adding an average value of each of the R signals, G signals, and B signals and the average value of each of the R signals, G signals, and B signals in the block selected by the block select unit to obtain the ratios of the average value of the R signals, the average value of G signals and the average value of B signals to the additive average value as the ratio coefficients.

2. The solid-state image pickup device according to claim 1, wherein the edge detection unit includes a difference determination unit which compares the difference between the W signal of the central pixel and the W signal of another W pixel with a specific value in each of said plurality of blocks and determines which is smaller of the two, and performs the logical OR operation using the result of the determination belonging to each of the blocks made by the difference determination unit and determines whether there is an edge of an image in each of the blocks.

3. The solid-state image pickup device according to claim 1, wherein the edge detection unit includes a difference determination unit which compares the difference between an addition signal of a plurality of pixels including the central pixel and an addition signal of another plurality of pixels with a specific value in each of said plurality of blocks and determines which is smaller of the two, and performs the logical OR operation using the result of the determination belonging to each of the blocks made by the difference determination unit and determines whether there is an edge of an image in each of the blocks.

4. The solid-state image pickup device according to claim 1, wherein the RGB signal generator unit generates a new R signal, G signal, and B signal by multiplying the W signal of the central pixel by the ratio coefficients of the R signal, G signal, and B signal calculated by the ratio calculating unit.

5. The solid-state image pickup device according to claim 4, further comprising a Bayer arrangement conversion unit which converts into a Bayer arrangement using the newly generated R signal, G signal, and B signal.

6. The solid-state image pickup device according to claim 1, wherein the specific area in the pixel unit is composed of a 7×7 pixel array and said plurality of blocks are composed of four blocks, each having a 4×4 pixel array.

7. The solid-state image pickup device according to claim 1, wherein the specific area in the pixel unit is composed of a 5×5 pixel array and said plurality of blocks are composed of four blocks, each having a 3×3 pixel array.

8. The solid-state image pickup device according to claim 1, further comprising a signal processing circuit which receives an R signal, a G signal, and a B signal generated by the RGB generator unit and carries out at least one of a white balance process, an edge enhancement process, a gamma correction process, and an RGB matrix circuit process.

9. The solid-state image pickup device according to claim 1, wherein the photoelectric conversion elements include photodiodes.

10. A solid-state image pickup device comprising: a pixel unit in which W pixels, R pixels, G pixels, and B pixels are arranged in rows and columns two-dimensionally, the W pixels, R pixels, G pixels, and B pixels each having photoelectric conversion elements provided with a white (W) filter, a red (R) filter, a green (G) filter, and a blue (B) filter respectively and which outputs W signals, R signals, G signals, and B signals obtained by photoelectrically converting light incident on the W pixels, R pixels, G pixels, and B pixels; an edge detection unit which determines a specific area having a W pixel provided with a white (W) filter as a central pixel in the pixel unit, divides the specific area into a plurality of blocks including the central pixel, and detects edge information as to whether there is an edge of an image in each of the blocks; a block select unit which selects a block with no edge from the edge information detected by the edge detection unit; a ratio calculating unit which calculates ratio coefficients of the R signals, G signals, and B signals from the block selected by the block select unit; and an RGB signal generator unit which generates a new R signal, G signal, and B signal from the W signal of the central pixel using the ratio coefficients calculated by the ratio calculating unit, wherein the edge detection unit includes a difference determination unit which compares the difference between the W signal of the central pixel and the W signal of another W pixel with a specific value in each of said plurality of blocks and determines which is smaller of the two, and performs the logical OR operation using the result of the determination belonging to each of the blocks made by the difference determination unit and determines whether there is an edge of an image in each of the blocks.

11. A solid-state image pickup device comprising: a pixel unit in which W pixels, R pixels, G pixels, and B pixels are arranged in rows and columns two-dimensionally, the W pixels, R pixels, G pixels, and B pixels each having photoelectric conversion elements provided with a white (W) filter, a red (R) filter, a green (G) filter, and a blue (B) filter respectively and which outputs W signals, R signals, G signals, and B signals obtained by photoelectrically converting light incident on the W pixels, R pixels, G pixels, and B pixels; an edge detection unit which determines a specific area having a W pixel provided with a white (W) filter as a central pixel in the pixel unit, divides the specific area into a plurality of blocks including the central pixel, and detects edge information as to whether there is an edge of an image in each of the blocks; a block select unit which selects a block with no edge from the edge information detected by the edge detection unit; a ratio calculating unit which calculates ratio coefficients of the R signals, G signals, and B signals from the block selected by the block select unit; and an RGB signal generator unit which generates a new R signal, G signal, and B signal from the W signal of the central pixel using the ratio coefficients calculated by the ratio calculating unit, wherein the edge detection unit includes a difference determination unit which compares the difference between an addition signal of a plurality of pixels including the central pixel and an addition signal of another plurality of pixels with a specific value in each of said plurality of blocks and determines which is smaller of the two, and performs the logical OR operation using the result of the determination belonging to each of the blocks made by the difference determination unit and determines whether there is an edge of an image in each of the blocks.

* * * * *